US012663895B2

(12) United States Patent
Yang et al.

(10) Patent No.: US 12,663,895 B2
(45) Date of Patent: Jun. 23, 2026

(54) DISPLAY DEVICE INCLUDING COVER TAPE DISPOSED ON A DRIVING CHIP AND CIRCUIT BOARD AND ELECTRONIC DEVICE INCLUDING DISPLAY DEVICE

(71) Applicant: SAMSUNG DISPLAY CO., LTD., Yongin-si (KR)

(72) Inventors: Taehyeon Yang, Yongin-si (KR); Hyeonseok Bae, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/969,487

(22) Filed: Dec. 5, 2024

(65) Prior Publication Data

US 2025/0190068 A1 Jun. 12, 2025

(30) Foreign Application Priority Data

Dec. 6, 2023 (KR) ......................... 10-2023-0175973

(51) Int. Cl.
*G06F 3/041* (2006.01)

(52) U.S. Cl.
CPC ...... *G06F 3/04164* (2019.05); *G06F 3/04186* (2019.05)

(58) Field of Classification Search
CPC ........................ G06F 3/04164; G06F 3/04186
See application file for complete search history.

(56) References Cited

U.S. PATENT DOCUMENTS

| | | | | | |
|---|---|---|---|---|---|
| 10,553,664 | B2 * | 2/2020 | Park | ....................... | H05K 1/117 |
| 2015/0029413 | A1 * | 1/2015 | Chang | ................... | G06F 3/0412 |
| | | | | | 349/12 |
| 2019/0019855 | A1 * | 1/2019 | Park | .................... | G02F 1/13452 |
| 2020/0285338 | A1 * | 9/2020 | Eom | ..................... | G06F 3/0445 |
| 2020/0310577 | A1 * | 10/2020 | Jeon | ..................... | H04M 1/0266 |
| 2022/0100346 | A1 * | 3/2022 | Kim | ..................... | H10K 59/131 |
| 2022/0404931 | A1 * | 12/2022 | Kim | ................... | G06F 3/04164 |

FOREIGN PATENT DOCUMENTS

| | | |
|---|---|---|
| KR | 10-2014-0071050 A | 6/2014 |
| KR | 10-2019-0117026 A | 10/2019 |
| KR | 10-2021-0001277 A | 1/2021 |
| KR | 10-2023-0010150 A | 1/2023 |

* cited by examiner

*Primary Examiner* — Afroza Chowdhury
(74) *Attorney, Agent, or Firm* — F. CHAU & ASSOCIATES, LLC

(57) ABSTRACT

A display device includes a substrate including a display area on which a plurality of pixels are disposed and a pad area disposed on a side of the display area, a touch member disposed on the substrate in the display area and including a plurality of touch electrodes, a driving chip disposed on the substrate in the pad area and configured to drive each of the plurality of pixels and the plurality of touch electrodes, a circuit board disposed on the substrate in the pad area and including a conductive pattern, which receives a reference voltage, and a cover tape disposed on the driving chip and the circuit board, and including a first conductive layer, which is electrically connected to the driving chip, and a second conductive layer which is disposed on the first conductive layer and is electrically connected to the conductive pattern.

21 Claims, 16 Drawing Sheets

NDA : PA , BA , PDA

F I G. 3
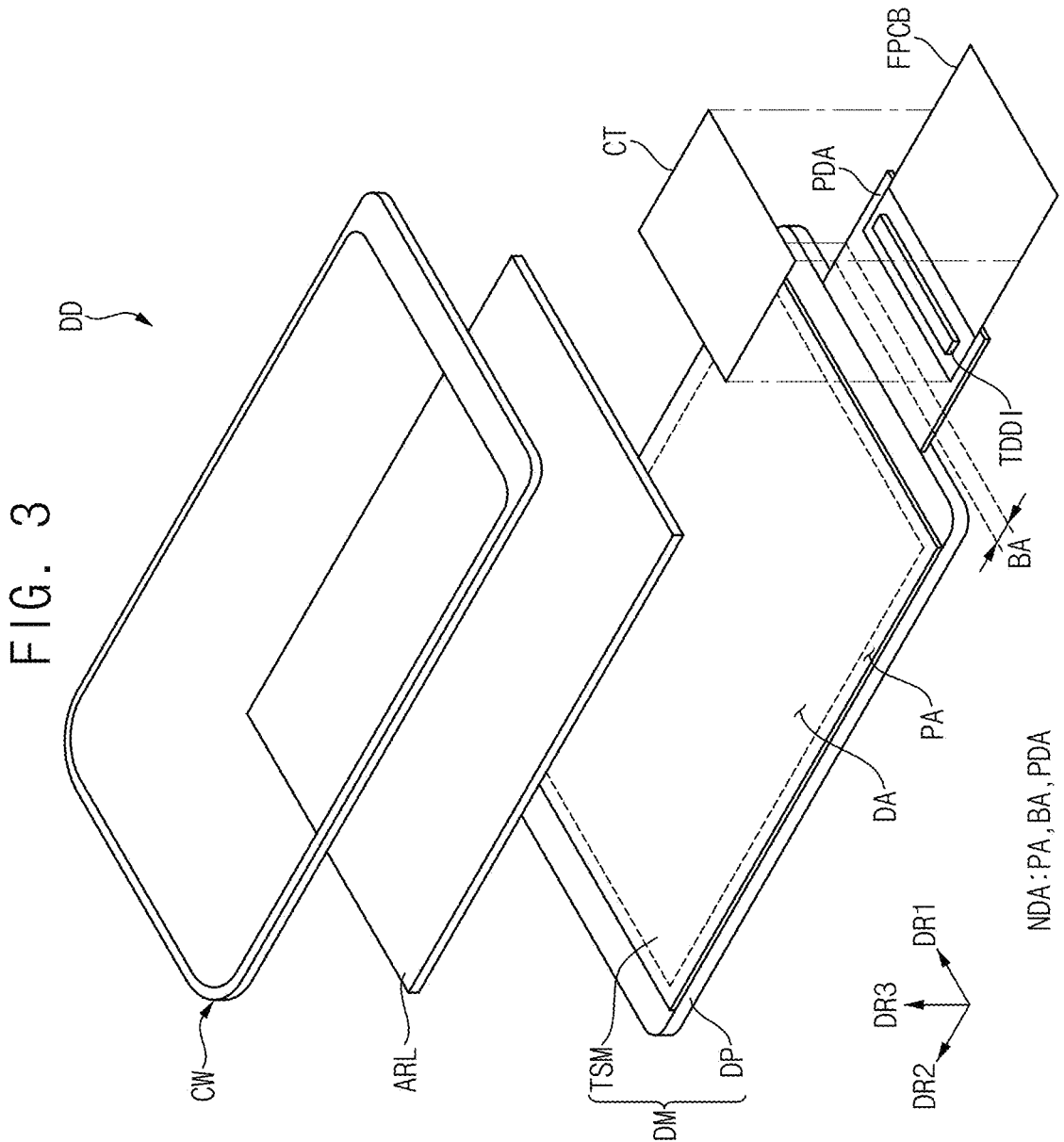

Figures 10, 11:
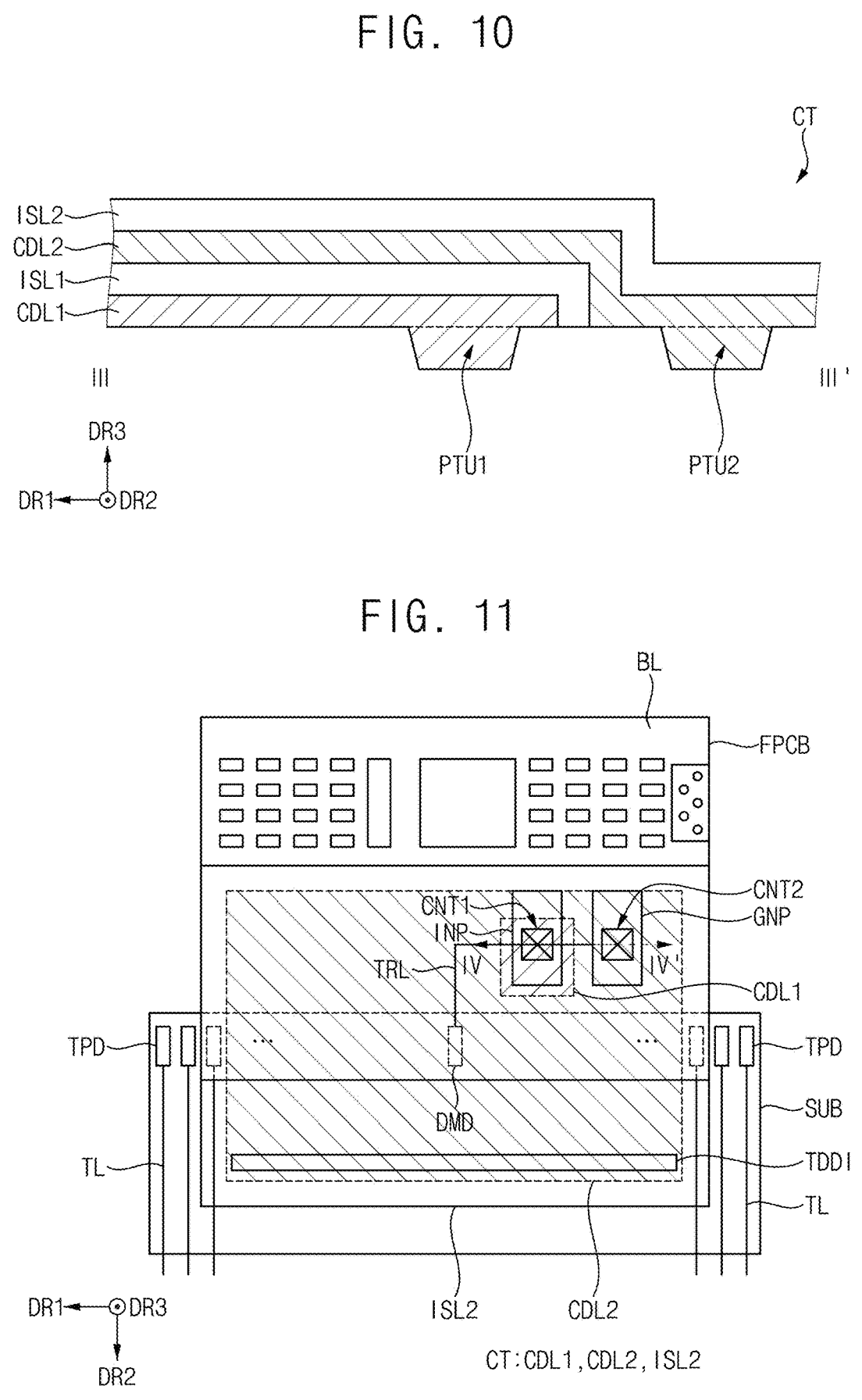

ISL2
CDL2
ISL1
CDL1

III

DR3
DR1 — ⊙DR2

PTU1          PTU2

III'

FPCB

CNT1
INP
TRL — IV

CNT2
GNP

IV'

CDL1

TPD

TPD

SUB

TL

DMD

TDDI

TL

DR1 — ⊙DR3

DR2

ISL2          CDL2

CT:CDL1,CDL2,ISL2

SUB-P2

BA

PA

DA

SUB-P1

CNM2

PLT3    TDDI    SUB-P3

CT'

PDA

CW

ARL

TSM

TFE

DP    DPL

DM    SUB

PLT1

PLT2

CNM1

FPCB'

NDA : PA, BA, PDA

DR3

⊗DR1

DR2

1

DISPLAY DEVICE INCLUDING COVER TAPE DISPOSED ON A DRIVING CHIP AND CIRCUIT BOARD AND ELECTRONIC DEVICE INCLUDING DISPLAY DEVICE

CROSS-REFERENCE TO RELATED APPLICATION

This application claims priority under 35 USC § 119 to Korean Patent Application No. 10-2023-0175973, filed on Dec. 6, 2023, in the Korean Intellectual Property Office, the content of which is herein incorporated by reference in its entirely.

BACKGROUND

1. Technical Field

The present disclosure relates generally to a display device. More particularly, the present disclosure relates to a display device which provides touch sensors and an electronic device including the display device.

2. Discussion of Related Art

Display devices have become an important connection medium between a user and information as information technology has developed. As a result, the use of display devices, such as liquid crystal display (LCD) devices, organic light emitting diode (OLED) display devices, plasma display panel (PDP) devices, and quantum dot display devices, is increasing.

A display device may include a touch member, which may detect a user's touch on a display panel. The touch member may include a plurality of touch electrodes and may obtain coordinate information according to an external input, such as the user's touch. For example, the touch member may sense an external input using a mutual capacitance method and/or a self-capacitance method.

SUMMARY

Embodiments, provide a display device, which is configured to detect a lifting phenomenon of a cover tape, with improved detection reliability of a touch member.

Embodiments, provide an electronic device including the display device.

A display device according to an embodiment of the present disclosure includes a substrate including a display area on which a plurality of pixels are disposed and a pad area disposed on a side of the display area, a touch member disposed on the substrate in the display area and including a plurality of touch electrodes, a driving chip disposed on the substrate in the pad area and configured to drive each of the plurality of pixels and the plurality of touch electrodes, a circuit board disposed on the substrate in the pad area and including a conductive pattern, which is configured to receive a reference voltage, and a cover tape disposed on the driving chip and the circuit board, and including a first conductive layer, which is electrically connected to the driving chip, and a second conductive layer which is disposed on the first conductive layer and is electrically connected to the conductive pattern.

In an embodiment, the display device may further include a plurality of touch pads disposed on the substrate in the pad area and electrically connected to the driving chip, and a dummy touch pad disposed on the substrate in the pad area and electrically connected to the driving chip, wherein the circuit board further includes one of a test line which is spaced apart from the conductive pattern and is electrically connected to the driving chip through the dummy touch pad or a test pad spaced apart from the conductive pattern, and a transmission line which electrically connects the test pad and the driving chip through the dummy touch pad.

A display device according to an embodiment of the present disclosure includes a substrate including a display area on which a plurality of pixels are disposed and a pad area disposed on a side of the display area, a touch member disposed on the substrate in the display area and including a plurality of touch electrodes, a driving chip disposed on the substrate in the pad area and configured to drive each of the plurality of pixels and the plurality of touch electrodes, a circuit board disposed on the substrate in the pad area and including a conductive pattern, which is configured to receive a reference voltage, a test pad spaced apart from the conductive pattern, and a transmission line which electrically connects the test pad and the driving chip, and a cover tape disposed on the driving chip and the circuit board, and including a first conductive layer which is electrically connected to the test pad and a second conductive layer which is disposed on the first conductive layer and is electrically connected to the conductive pattern.

In an embodiment, the display device may further include a plurality of touch lines disposed on the substrate and electrically connecting the plurality of touch lines and the driving chip. The plurality of touch lines may be spaced apart from the circuit board.

In an embodiment, the transmission line may be electrically insulated from the plurality of touch electrodes and the plurality of touch lines.

In an embodiment, the display device may further include a plurality of touch pads disposed on the substrate in the pad area and electrically connecting the plurality of touch lines and the driving chip, and a dummy touch pad disposed on the substrate in the pad area, spaced apart from the plurality of touch lines, and electrically connected to the driving chip, wherein the transmission line may be electrically connected to the driving chip through the dummy touch pad.

In an embodiment, the driving chip may be configured to detect a lifting phenomenon of the cover tape based on a parasitic capacitance value, wherein the transmission line may be configured to transmit the parasitic capacitance value between the test pad and the first conductive layer to the driving chip when the cover tape is lifted from the circuit board.

In an embodiment, a first in-plane area on which the first conductive layer is disposed may be smaller than a second in-plane area on which the second conductive layer is disposed. In an embodiment, the substrate may include a first portion on which the plurality of pixels are disposed, a second portion extending from the first portion and having a curvature following a bending of the substrate, and a third portion extending from the second portion, facing the first portion, and on which the driving chip is disposed.

In an embodiment, the test pad may directly contact the first conductive layer, and the conductive pattern may directly contact the second conductive layer.

In an embodiment, the display device may further include a conductive adhesive layer disposed between the circuit board and the cover tape, electrically connecting the test pad and the first conductive layer, and electrically connecting the conductive pattern and the second conductive layer.

In an embodiment, the cover tape may further include a first insulating layer disposed between the first conductive layer and the second conductive layer, and electrically insulating the first conductive layer from the second conductive layer, and a second insulating layer disposed on the second conductive layer.

In an embodiment, the circuit board may further include an insulating layer covering the conductive pattern, the test pad, and the transmission line. The insulating layer may define a first contact hole exposing the test pad and a second contact hole exposing the conductive pattern.

A display device according to another embodiment of the present disclosure includes a substrate including a display area on which a plurality of pixels are disposed and a pad area disposed on a side of the display area, a touch member disposed on the substrate in the display area and including a plurality of touch electrodes, a driving chip disposed on the substrate in the pad area and configured to drive each of the plurality of pixels and the plurality of touch electrodes, a circuit board disposed on the substrate in the pad area and including a conductive pattern, which is configured to receive a reference voltage, and a test line which is spaced apart from the conductive pattern and is electrically connected to the driving chip, and a cover tape disposed on the driving chip and the circuit board, and including a first conductive layer which is electrically connected to the test line and a second conductive layer which is disposed on the first conductive layer and is electrically connected to the conductive pattern.

In an embodiment, the display device may further include a plurality of touch lines disposed on the substrate and electrically connecting the plurality of touch electrodes and the driving chip. The plurality of touch lines may be spaced apart from the circuit board.

In an embodiment, the test line may be electrically insulated from the plurality of touch electrodes and the plurality of touch lines.

In an embodiment, the display device may further include a plurality of touch pads disposed on the substrate in the pad area and electrically connecting the plurality of touch lines and the driving chip, and a dummy touch pad disposed on the substrate in the pad area, spaced apart from the plurality of touch lines, and electrically connected to the driving chip, wherein the test line may be electrically connected to the driving chip through the dummy touch pad.

In an embodiment, the driving chip may be configured to detect a lifting phenomenon of the cover tape based on a parasitic capacitance value, wherein the test line may be configured to transmit the parasitic capacitance value between the test line and the first conductive layer to the driving chip when the cover tape is lifted from the circuit board.

In an embodiment, a first in-plane area on which the first conductive layer is disposed may be smaller than a second in-plane area on which the second conductive layer is disposed.

In an embodiment, the substrate may include a first portion on which the plurality of pixels are disposed, a second portion extending from the first portion and having a curvature following a bending of the substrate, and a third portion extending from the second portion, facing the first portion, and on which the driving chip is disposed.

An electronic device according to an embodiment of the present disclosure includes a display device and a power supply configured to provide power to the display device. The display device includes a substrate including a display area on which a plurality of pixels are disposed and a pad area disposed on a side of the display area, a touch member disposed on the substrate in the display area and including a plurality of touch electrodes, a driving chip disposed on the substrate in the pad area and configured to drive each of the plurality of pixels and the plurality of touch electrodes, a circuit board disposed on the substrate in the pad area and including a conductive pattern, which is configured to receive a reference voltage, and a cover tape disposed on the driving chip and the circuit board, and including a first conductive layer, which is electrically connected to the driving chip, and a second conductive layer which is disposed on the first conductive layer and is electrically connected to the conductive pattern.

A display device according to an embodiment of the present disclosure may include a touch member including a plurality of touch electrodes, a driving chip which drives each of a plurality of pixels and the plurality of touch electrodes, a circuit board including a test pad and a transmission line electrically connecting the test pad and the driving chip, and a cover tape covering each of the driving chip and the circuit board, and including a first conductive layer electrically connected to the test pad.

When at least a portion of the cover tape is lifted from the circuit board, the first conductive layer may not be electrically connected to the test pad. In this case, parasitic capacitance may be formed between the test pad and the first conductive layer. The transmission line may transmit a parasitic capacitance value between the test pad and the first conductive layer to the driving chip. The driving chip may detect the lifting phenomenon of the cover tape by comparing the parasitic capacitance value with a reference value for checking the lifting phenomenon of the cover tape.

Accordingly, the lifting phenomenon of the cover tape, which may cause a ghost touch phenomenon, may be detected, and a lifted cover tape may be repaired or replaced. As a result, the ghost touch phenomenon may be prevented and detection reliability of the touch member may be improved.

BRIEF DESCRIPTION OF THE DRAWINGS

Illustrative, non-limiting embodiments will be more clearly understood from the following detailed description in conjunction with the accompanying drawings.

FIG. 3 is a perspective view illustrating the display device of FIG. 1.

FIG. 4 is a cross-sectional view illustrating the display device of FIG. 1.

FIG. 10 is a cross-sectional view taken along line III-III' of FIG. 9.

FIG. 11 is a plan view illustrating the circuit board of FIG. 7 and the cover tape of FIG. 9 attached.

FIG. 13 is a cross-sectional view illustrating a display device according to another embodiment of the present disclosure.

DETAILED DESCRIPTION

Figure 1:
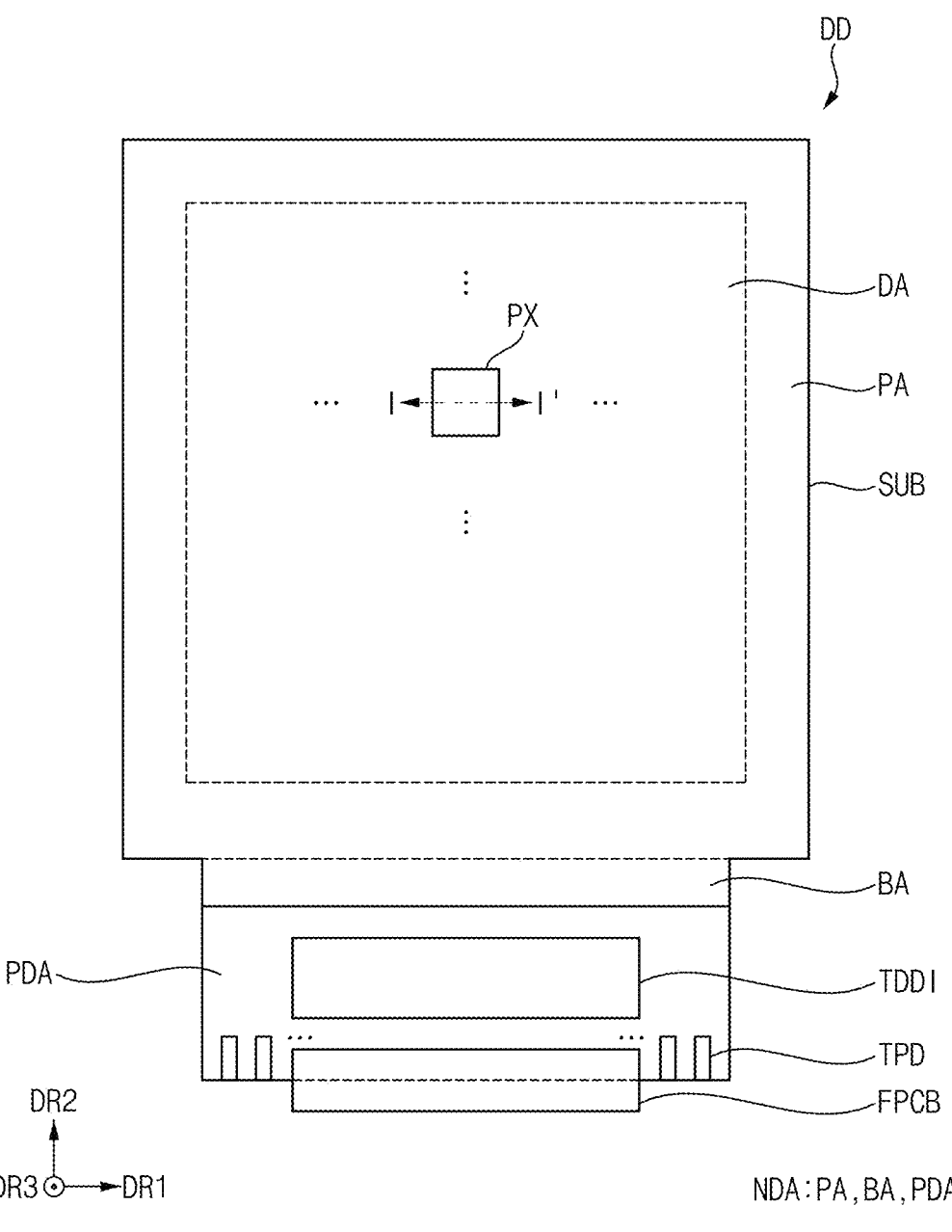
FIG. 1 is a plan view illustrating a display device according to an embodiment of the present disclosure.

Hereinafter, embodiments of the present disclosure will be described in detail with reference to the accompanying drawings. The same reference numerals are used for the same components in the drawings, and redundant descriptions of the same components may be omitted.

Figure 2:
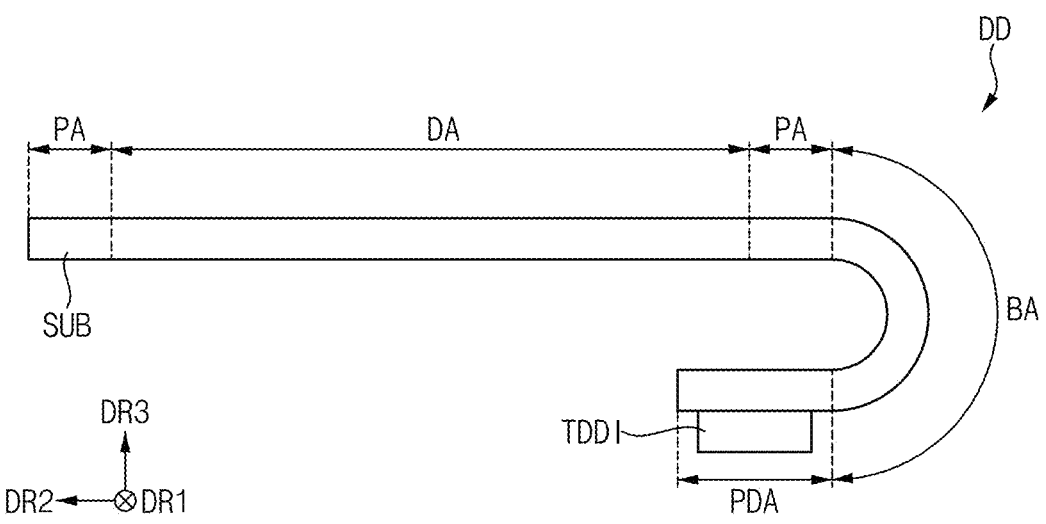
FIG. 2 is a view illustrating a bent form of the display device of FIG. 1.

FIG. 1 is a plan view illustrating a display device according to an embodiment of the present disclosure. FIG. 2 is a view illustrating a bent form of the display device of FIG. 1.

In this specification, a plane may be defined by a first direction DR1 and a second direction DR2 intersecting the first direction DR1. For example, the first direction DR1 and the second direction DR2 may be perpendicular to each other. A direction normal to the plane, that is, a thickness direction of a display device DD may be a third direction DR3. In other words, the third direction DR3 may be perpendicular to each of the first direction DR1 and the second direction DR2.

Referring to FIG. 1 and FIG. 2, the display device DD according to an embodiment of the present disclosure may include a substrate SUB, a driving chip TDDI, and a circuit board FPCB.

The substrate SUB may include a display area DA and a non-display area NDA. The display area DA may be defined as an area which may display an image. The display area DA may display an image by, for example, generating light or adjusting the transmittance of light provided from an external light source. A plurality of pixels PX may be disposed in the display area DA. Each of the pixels PX may generate light according to a pixel driving signal. For example, the pixels PX may be disposed in a matrix form along the first direction DR1 and the second direction DR2.

The non-display area NDA may be defined as an area which may not display an image. The non-display area NDA may include a peripheral area PA, a bending area BA, and a pad area PDA. The bending area BA may extend from the peripheral area PA, and the pad area PDA may extend from the bending area BA. For example, the peripheral area PA and the pad aera PDA may be separated by the bending area BA.

The peripheral area PA may be disposed around the display area DA. The peripheral area PA may surround at least a portion of the display area DA. For example, the peripheral area PA may entirely surround the display area DA in a plan view.

The bending area BA may extend from a side of the peripheral area PA and may be bent downward. In other words, as illustrated in FIG. 2, the substrate SUB may be bent about a reference axis substantially parallel to the first direction DR1 in the bending area BA. In this case, the pad area PDA may be disposed on a bottom of the display device DD. The pad area PDA may extend from the bending area BA and may be disposed under the display area DA and/or the peripheral area PA. When the display device DD is laid flat or unfolded, the bending area BA may be disposed between the peripheral area PA and the pad area PDA.

The pad area PDA may be disposed on a side of the display area DA. For example, the pad area PDA and the display area DA may be spaced apart from each other in the second direction DR2. The pad area PDA may be spaced apart from the display area DA with the bending area BA interposed therebetween. The pad area PDA may extend in the first direction DR1. A length of the pad area PDA in the first direction DR1 may be equal to or less than a length of the peripheral area PA in the first direction DR1. A plurality of pads may be disposed in the pad area PDA. The plurality of pads may include a plurality of touch pads TPD.

The driving chip TDDI may be disposed on the substrate SUB. The driving chip TDDI may be disposed in the pad area PDA. Specifically, the driving chip TDDI may be mounted on the substrate SUB in the pad area PDA. For example, when the substrate SUB is formed of glass, the driving chip TDDI may be mounted on the substrate SUB in a chip on glass (COG) form. In another example, when the substrate SUB is formed of plastic, the driving chip TDDI may be mounted on the substrate SUB in a chip on plastic (COP) form. The driving chip TDDI may be connected to the touch pads TPD through, for example, an anisotropic conductive film (ACF) (not shown).

In an embodiment, the driving chip TDDI may provide a pixel driving signal to the pixels PX. The driving chip TDDI may provide a touch driving signal to a plurality of touch electrodes (e.g., touch electrodes TSE of FIG. 6). In other words, the driving chip TDDI may include a touch display driver integrated circuit, which may include a pixel driving circuit and a touch driving circuit. The pixel driving circuit may drive the pixel PX. The touch driving circuit may drive the plurality of touch electrodes. That is the driving chip TDDI may provide Touch/Display Integration (TDDI) features.

The circuit board FPCB may be disposed on the substrate SUB in the pad area PDA. Specifically, a first end of the circuit board FPCB may be attached to the substrate SUB and may overlap a portion of the pad area PDA. For example, the circuit board FPCB may be a flexible printed circuit board.

Figure 4:
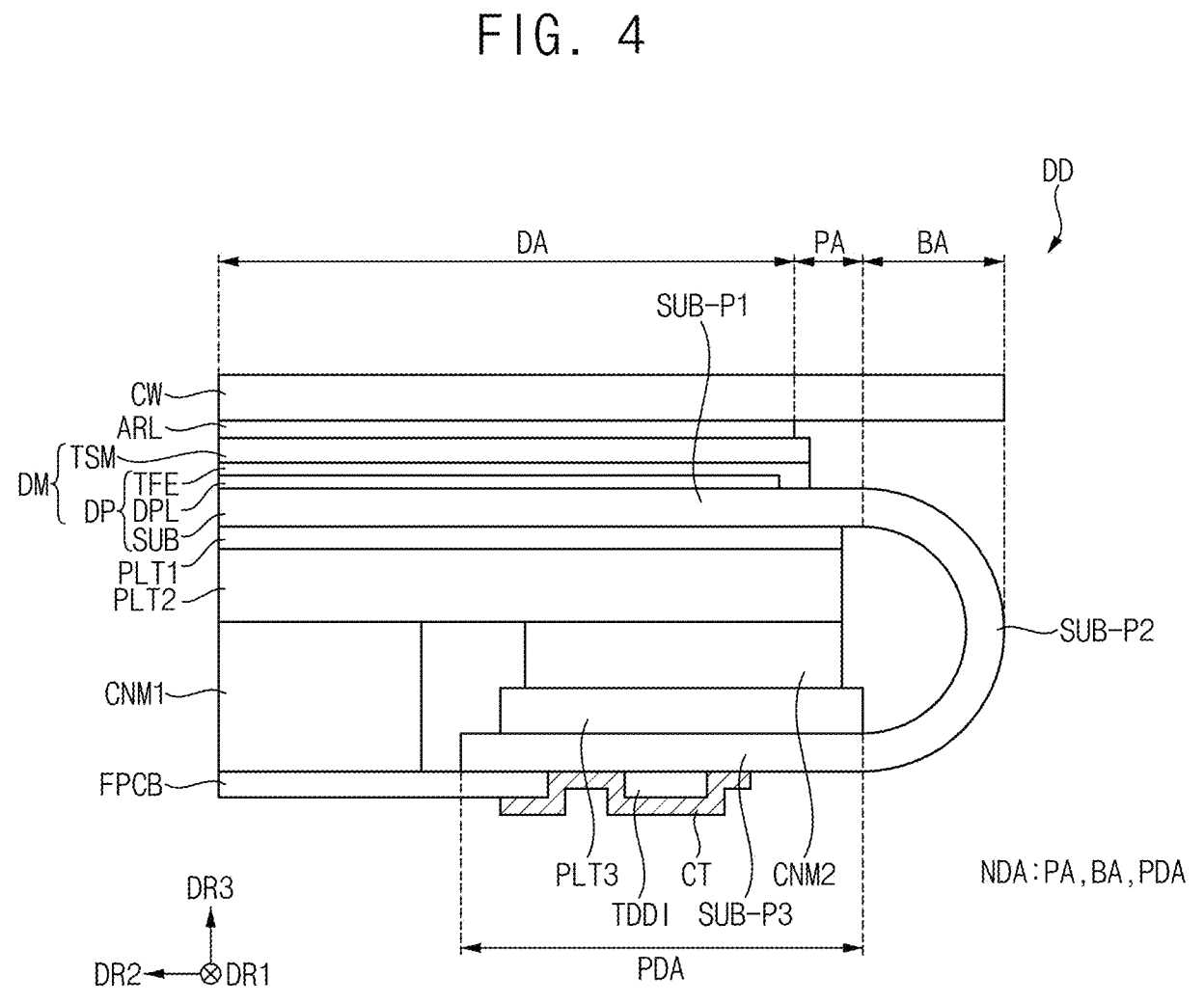
Figure 5:
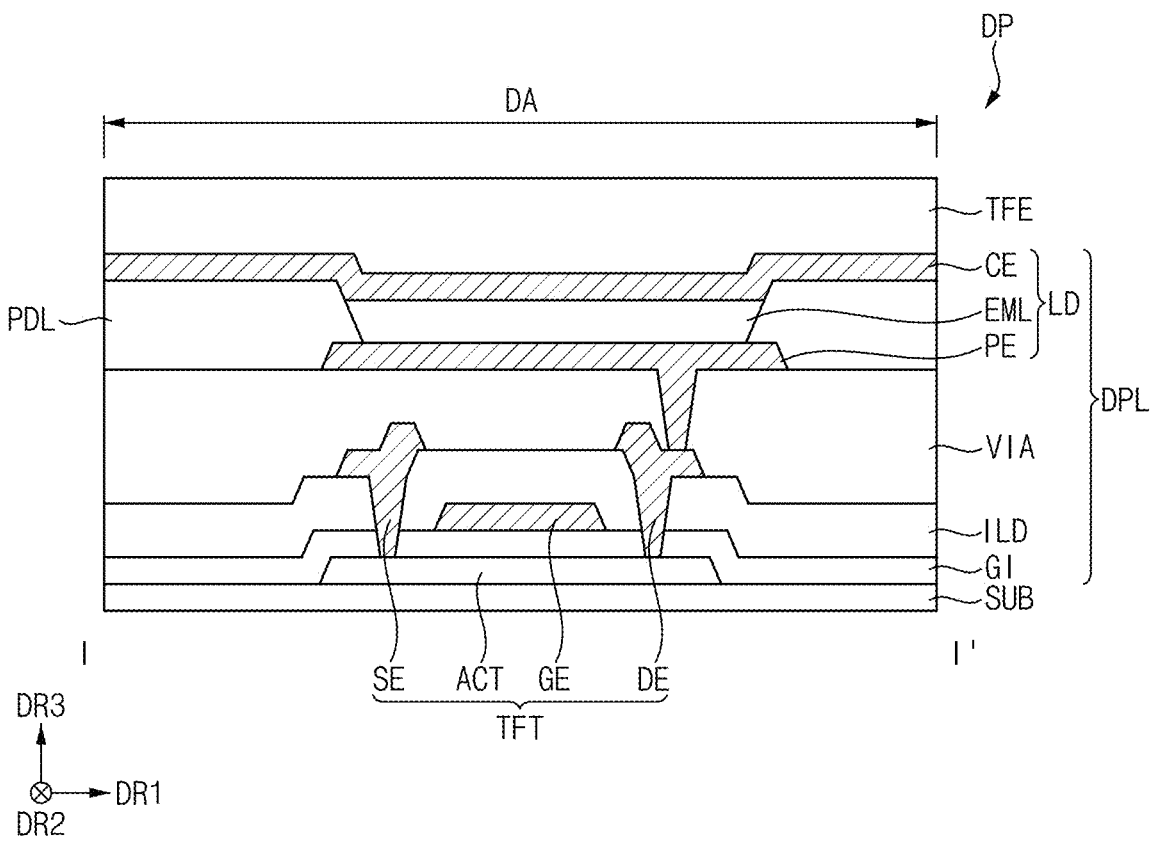
FIG. 5 is a cross-sectional view taken along line I-I' of FIG. 1.
Figure 6:
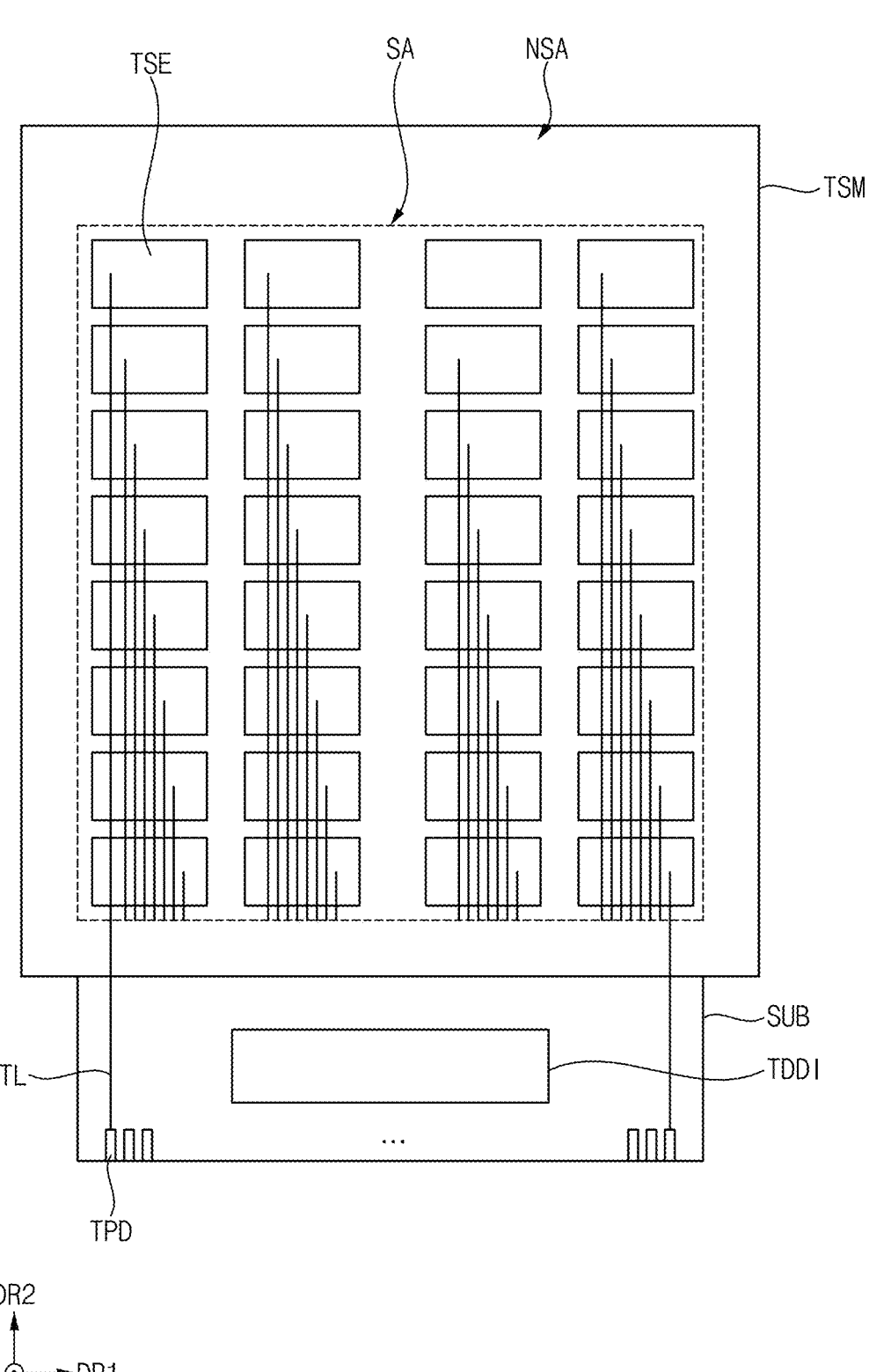
FIG. 6 is a plan view illustrating a touch member included in the display device of FIG. 1.

FIG. 3 is a perspective view illustrating the display device of FIG. 1. FIG. 4 is a cross-sectional view illustrating the display device of FIG. 1. FIG. 5 is a cross-sectional view taken along line I-I' of FIG. 1. FIG. 6 is a plan view illustrating a touch member included in the display device of FIG. 1.

Referring to FIG. 3, FIG. 4, FIG. 5, and FIG. 6, the display device DD according to an embodiment of the present disclosure may include a cover window CW, an anti-reflection layer ARL, a display module DM, a first plate PLT1, a second plates PLT2, a third plate PLT3, a first connection member CNM1, a second connection member CNM2, the driving chip TDDI, the circuit board FPCB, and a cover tape CT. The display module DM may include a display panel DP and a touch member TSM. The display panel DP may include the substrate SUB, a display element layer DPL, and an encapsulation layer TFE.

The substrate SUB may include a transparent material or an opaque material. For example, the substrate SUB may be formed of a transparent resin substrate. A polyimide substrate may be an example of the transparent resin substrate. The polyimide substrate may include a first organic layer, a first barrier layer, and a second organic layer. Alternatively, the substrate SUB may include a quartz substrate, a synthetic quartz substrate, a calcium fluoride substrate, a fluorine-doped quartz substrate, a soda-lime glass substrate, or a non-alkali glass substrate. These may be used alone or in combination with each other.

The substrate SUB may be bent. The substrate SUB may be bent about a reference axis parallel to the first direction DR1 in the bending area BA. That is, the substrate SUB may include a first portion SUB-P1 on which the pixels (e.g., the pixels PX of FIG. 1) may be disposed, a second portion SUB-P2 extending from the first portion SUB-P1 and having a curvature substantially following the bending of the substrate SUB, and a third portion SUB-P3 extending from the second portion SUB-P2 and on which the driving chip TDDI may be disposed. In a case that the second portion SUB-P2 of the substrate SUB is bent, the third portion SUB-P3 of the substrate SUB may face the first portion SUB-P1 of the substrate SUB.

The display element layer DPL may be disposed on the substrate SUB. Specifically, as illustrated in FIG. 5, the display element layer DPL may include a thin film transistor TFT, a gate insulating layer GI, an inter-layer insulating layer ILD, a via-insulating layer VIA, a light emitting element LD, and a pixel defining layer PDL. The thin film transistor TFT may include an active pattern ACT, a gate electrode GE, a source electrode SE, and a drain electrode DE. The light emitting element LD may include a pixel electrode PE, a light emitting layer EML, and a common electrode CE.

A buffer layer (not shown) may be disposed between the substrate SUB and the display element layer DPL. The buffer layer may inhibit or prevent diffusion of metal atoms or impurities from the substrate SUB to an upper structure (e.g., the thin film transistor TFT or the light emitting element LD). In addition, the buffer layer may aid in the formation of the active pattern ACT having a substantially uniform shape. For example, the buffer layer may control a heat transfer rate during a crystallization process for forming the active pattern ACT. In addition, the buffer layer may serve to improve flatness of a surface of the substrate SUB. The buffer layer may include, for example, an inorganic insulating material. Alternatively, the buffer layer may be omitted.

The active pattern ACT may be disposed on the substrate SUB. The active pattern ACT may include an oxide semiconductor, a silicon semiconductor, or an organic semiconductor. For example, the oxide semiconductor may include indium (In), gallium (Ga), tin (Sn), zirconium (Zr), vanadium (V), hafnium (Hf), cadmium (Cd), germanium (Ge), chromium (Cr), titanium (Ti), or zinc (Zn). These materials may be used alone or in combination with each other. The silicon semiconductor may include amorphous silicon or polycrystalline silicon. The active pattern ACT may include a source area, a drain area, and a channel area disposed between the source area and the drain area.

The gate insulating layer GI may be disposed on the substrate SUB and the active pattern ACT. The gate insulating layer GI may cover the active pattern ACT on the substrate SUB and may be disposed along the profile of the active pattern ACT with a substantially uniform thickness. Alternatively, the gate insulating layer GI may sufficiently cover the active pattern ACT on the substrate SUB, and may have a substantially flat upper surface without a step difference around the active pattern ACT. The gate insulating layer GI may include an inorganic insulating material. Examples of the inorganic insulating material that may be used as the gate insulating layer GI may include silicon oxide ($SiO_x$), silicon nitride ($SiN_x$), or silicon oxynitride ($SiO_xN_y$). These may be used alone or in combination with each other. The gate insulating layer GI may electrically insulate the active pattern ACT from the gate electrode GE.

The gate electrode GE may be disposed on the gate insulating layer GI. The gate electrode GE may overlap the channel area of the active pattern ACT. The gate electrode GE may include a metal, an alloy, a metal nitride, a conductive metal oxide, or a transparent conductive material. Examples of material that may be used as the gate electrode GE may include silver (Ag), an alloy including silver, molybdenum (Mo), an alloy including molybdenum, aluminum (Al), an alloy including aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), or indium zinc oxide (IZO). These may be used alone or in combination with each other.

The inter-layer insulating layer ILD may be disposed on the gate electrode GE and the gate insulating layer GI. The inter-layer insulating layer ILD may cover the gate electrode GE on the gate insulating layer GI and may be disposed along the profile of the gate electrode GE with a substantially uniform thickness. Alternatively, the inter-layer insulating layer ILD may sufficiently cover the gate electrode GE on the gate insulating layer GI, and may have a substantially flat upper surface without a step difference around the gate electrode GE. The inter-layer insulating layer ILD may include an inorganic insulating material. Examples of the inorganic insulating material that may be used as the inter-layer insulating layer ILD may include silicon oxide ($SiO_x$), silicon nitride ($SiN_x$), or silicon oxynitride ($SiO_xN_y$). These may be used alone or in combination with each other. The inter-layer insulating layer ILD may electrically insulate the gate electrode GE from the source electrode SE. In addition, the inter-layer insulating layer ILD may electrically insulate the gate electrode GE from the drain electrode DE.

The source electrode SE and the drain electrode DE may be disposed on the inter-layer insulating layer ILD. The source electrode SE may be connected to the source area of the active pattern ACT through a contact hole penetrating the gate insulating layer GI and the inter-layer insulating layer ILD. The drain electrode DE may be connected to the drain area of the active pattern ACT through a contact hole penetrating the gate insulating layer GI and the inter-layer insulating layer ILD. Each of the source electrode SE and the drain electrode DE may include, for example, a metal, an alloy, a metal nitride, a conductive metal oxide, or a transparent conductive material. These may be used alone or in combination with each other.

Accordingly, the thin film transistor TFT including the active pattern ACT, the gate electrode GE, the source electrode SE, and the drain electrode DE may be formed.

The via-insulating layer VIA may be disposed on the inter-layer insulating layer ILD. For example, the via-insulating layer VIA may be disposed on the inter-layer insulating layer ILD with a relatively thick thickness to sufficiently cover the source electrode SE and the drain electrode DE. The via-insulating layer VIA may include an organic insulating material. Examples of the organic insulating material that may be used as the via-insulating layer VIA may include photoresist, polyacryl-based resin, polyimide-based resin, polyamide-based resin, siloxane-based resin, acryl-based resin, or epoxy-based resin. These may be used alone or in combination with each other.

The pixel electrode PE may be disposed on the via-insulating layer VIA. The pixel electrode PE may overlap the thin film transistor TFT. For example, the pixel electrode PE may overlap the electrode GE, the source electrode SE, and the drain electrode DE of the thin film transistor TFT. The pixel electrode PE may be connected to the drain electrode DE through a contact hole penetrating the via-insulating layer VIA. Accordingly, the pixel electrode PE may be electrically connected to the thin film transistor TFT. For example, the pixel electrode PE may be a reflective electrode, a semi-transmissive electrode, or a transmissive electrode. The pixel electrode PE may include a metal, an alloy, a metal nitride, a conductive metal oxide, or a transparent conductive material. These materials may be used alone or in combination with each other. For example, the pixel electrode PE may serve as an anode electrode.

The pixel defining layer PDL may be disposed on the via-insulating layer VIA and the pixel electrode PE. The pixel defining layer PDL may cover an edge of the pixel electrode PE. The pixel defining layer PDL may expose an upper surface of the pixel electrode PE. For example, the pixel defining layer PDL may expose an upper surface at a central portion of the pixel electrode PE. The pixel defining layer PDL may include an organic insulating material. Examples of the organic insulating material that may be used as the pixel defining layer PDL may include photoresist, polyacryl-based resin, polyimide-based resin, polyamide-based resin, siloxane-based resin, acryl-based resin, or epoxy-based resin. These materials may be used alone or in combination with each other.

The light emitting layer EML may be disposed on the pixel electrode PE. Specifically, the light emitting layer EML may be disposed on the upper surface of the pixel electrode PE exposed by the pixel defining layer PDL. The light emitting layer EML may emit light having a specific color (e.g., red, green, or blue). In an embodiment, the light emitting layer EML may include at least one of an organic light emitting material or a quantum dot. For example, the light emitting layer EML may include an organic light emitting material including a fluorescent or phosphorescent material that emits red, green, blue, or white light. The quantum dot may be a particle having a crystal structure of several to tens of nanometers in size, and may include hundreds to thousands of atoms. The quantum dot may include a fluorescent material or a phosphorescent material, and may produce monochromatic red, green, or blue light.

For example, the light emitting layer EML may have a single-layer structure including an light emitting layer. Alternatively, the light emitting layer EML may have a structure including a plurality of light emitting layers.

The common electrode CE may be disposed on the pixel defining layer PDL and the light emitting layer EML. The common electrode CE may cover each of the pixel defining layer PDL and the light emitting layer EML. The common electrode CE may be disposed along the profiles of the pixel defining layer PDL and the light emitting layer EML with a substantially uniform thickness. For example, the common electrode CE may include a metal, an alloy, a metal nitride, a conductive metal oxide, or a transparent conductive material. These materials may be used alone or in combination with each other. For example, the common electrode CE may serve as a cathode electrode.

Accordingly, the light emitting element LD including the pixel electrode PE, the light emitting layer EML, and the common electrode CE may be formed.

The encapsulation layer TFE may be disposed on the common electrode CE. The encapsulation layer TFE may inhibit or prevent impurities or moisture from penetrating into the light emitting element LD from the outside. The encapsulation layer TFE may include at least one inorganic encapsulation layer and at least one organic encapsulation layer. For example, the inorganic encapsulation layer may include silicon oxide ($SiO_x$), silicon nitride ($SiN_x$), or silicon oxynitride ($SiO_xN_y$). These materials may be used alone or in combination with each other. For example, the organic encapsulation layer may include a cured polymer such as polyacrylate.

The encapsulation layer TFE may have a structure in which the inorganic encapsulation layer and the organic encapsulation layer are alternately stacked. For example, the encapsulation layer TFE may have a three-layer structure in which two inorganic encapsulation layers and one organic encapsulation layer are alternately stacked. However, the present disclosure is not limited thereto, and the encapsulation layer TFE may have a five-layer structure in which three inorganic encapsulation layers and two organic encapsulation layers are alternately stacked, or may have a seven-layer structure in which four inorganic encapsulation layers and three organic encapsulation layers are alternatively stacked.

Although the display device DD of the present disclosure is described in the context of the organic light emitting display device, the configuration of the present disclosure is not limited thereto. In other embodiments, the display device DD may include a liquid crystal display (LCD) device, a field emission display (FED) device, a plasma display panel (PDP) device, an electrophoretic image display (EPD) device, an inorganic light emitting display (ILED) device, or a quantum dot display device.

As illustrated in FIG. 3, FIG. 4, and FIG. 6, the touch member TSM may be disposed on the display panel DP. The touch member TSM may overlap the display area DA. The touch member TSM may overlap a portion of the peripheral area PA. The touch member TSM may be directly disposed on the display panel DP. In other words, the touch member TSM may be directly disposed on the display panel DP without an adhesive member. Alternatively, the touch member TSM may be attached to an upper surface of the display panel DP by an adhesive member disposed between the touch member TSM and the upper surface of the display panel DP. The adhesive member may include a pressure sensitive adhesive (PSA) film, an optically clear adhesive (OCA) film, or an optically clear resin (OCR).

The touch member TSM may detect an external input, such as a user's touch. For example, the touch member TSM may acquire coordinate information according to the external input.

The touch member TSM may include a sensing area SA and a non-sensing area NSA. The sensing area SA may correspond to the display area DA of the substrate SUB. The non-sensing area NSA may correspond to the peripheral area PA of the substrate SUB. For example, the non-sensing area NSA may entirely surround the sensing area SA in a plan view.

The touch member TSM may include a plurality of touch electrodes TSE and a plurality of touch lines TL connected to the plurality of touch electrodes TSE.

The touch electrodes TSE may be disposed in the sensing area SA. The touch electrodes TSE may have various shapes and may be disposed in various arrangements depending on the touch detection method of the touch member TSM. The touch member TSM may sense an external input using a mutual capacitance method and/or a self-capacitance method. In an embodiment, the touch member TSM may sense an external input using a self-capacitance method. In this case, the touch electrodes TSE may be arranged in a matrix form along the first direction DR1 and the second direction DR2. Each of the touch electrodes TSE may be connected to one or more touch lines TL.

The touch lines TL may be disposed in the non-sensing area NSA. The touch lines TL may be connected to the touch pads TPD through contact holes. Specifically, each of the touch lines TL may include a first touch line and a second touch line. The first touch line may extend from the non-sensing area NSA on the touch member TSM and may contact the touch electrode TSE. The second touch line may be connected to the first touch line through a contact hole, may extend from the non-display area NDA on the substrate SUB, and may contact the touch pad TPD. Accordingly, the touch lines TL may electrically connect the touch electrodes TSE and the touch pads TPD. The driving chip TDDI may provide the touch driving signal to the touch electrodes TSE through the touch pads TPD and the touch lines TL. The touch electrodes TSE may provide a touch detection signal to the driving chip TDDI through the touch lines TL and the touch pads TPD based on the external input that has been sensed.

As illustrated in FIG. 4, the anti-reflection layer ARL may be disposed on the touch member TSM in the display area DA. The anti-reflection layer ARL may reduce external light reflection of the display device DD. By reducing the external light reflection, the anti-reflection layer ARL may improve the visibility of the display device DD. The anti-reflection layer ARL may include a polarizer and/or a phase retarder. For example, the anti-reflection layer ARL may include a stretched film-type polarizer and/or a phase retarder. Alternatively, the anti-reflection layer ARL may include color filters and a black matrix disposed between the color filters. The color filters may have a predetermined arrangement. That is, the color filters may be arranged taking into account light emitting colors of the light emitting elements LD included in the display element layer DPL.

The cover window CW may be disposed on the anti-reflection layer ARL. The cover window CW may be attached to an upper surface of the anti-reflection layer ARL through an adhesive member. The cover window CW may cover and protect the display module DM. The cover window CW may include glass or plastic.

The first plate PLT1 may be disposed under the substrate SUB. For example, the substrate SUB may be disposed between the first plate PLT1 and the display element layer DPL. The first plate PLT1 may supplement the rigidity of the substrate SUB. The first plate PLT1 may maintain a portion of the substrate SUB, which overlaps the display area DA, in a flat state. For example, the first plate PLT1 may be relatively rigid and may not bend. The first plate PLT1 may include an organic material. Examples of the organic material that may be used as the first plate PLT1 may include polyethylene terephthalate (PET), polyimide (PI), or polyethylene naphthalate (PEN). However, the present disclosure is not limited thereto.

The second plate PLT2 may be disposed under the first plate PLT1. The second plate PLT2 may include a cushion layer disposed adjacent to the first plate PLT1 and a heat dissipation layer disposed under the cushion layer. The cushion layer may protect the substrate SUB from external shock. For example, the cushion layer may include foam tape or foam pad. The heat dissipation layer may effectively dissipate heat generated from the driving chip TDDI. For example, the heat dissipation layer may include graphite or a metal with high thermal conductivity such as copper (Cu) or aluminum (Al).

The first plate PLT1 and the second plate PLT2 may overlap the display area DA. The first plate PLT1 and the second plate PLT2 may not overlap the bending area BA. In other words, the first plate PLT1 and the second plate PLT2 may be disposed under the substrate SUB in the display area DA, and may not be disposed under the substrate SUB in the bending area BA and the pad area PDA. For example, the bending area BA may not be supported by the first plate PLT1 and the second plate PLT2.

The third plate PLT3 may be disposed under the substrate SUB in the pad area PDA. The third plate PLT3 may supplement the rigidity of the substrate SUB. The third plate PLT3 may maintain a portion of the substrate SUB, which overlaps the pad area PDA, in a flat state. For example, the third plate PLT3 may be relatively rigid and may not bend.

The first connection member CNM1 may be disposed under the second plate PLT2. Specifically, the first connection member CNM1 may be disposed between the second plate PLT2 and the circuit board FPCB. The first connection member CNM1 may directly contact the second plate PLT2 and the circuit board FPCB. The first connection member CNM1 may fix the circuit board FPCB.

The second connection member CNM2 may be disposed under the second plate PLT2. Specifically, the second connection member CNM2 may be disposed between the second plate PLT2 and the third plate PLT3. The second connection member CNM2 may directly contact the second plate PLT2 and the third plate PLT3. The second connection member CNM2 may maintain the substrate SUB in a bent state. In other words, the second connection member CNM2 may maintain a portion of the substrate SUB, which overlaps the bending area BA, in a bent state.

The driving chip TDDI may be disposed on the substrate SUB in the pad area PDA. The driving chip TDDI may be electrically connected to the touch pads TPD. Accordingly, the driving chip TDDI may provide the touch driving signal to the touch electrodes TSE through the touch pads TPD and the touch lines TL. In addition, the driving chip TDDI may provide the pixel driving signal to the display panel DP.

The circuit board FPCB may be disposed on the substrate SUB in the pad area PDA. The circuit board FPCB may include a conductive pattern (e.g., a conductive pattern GNP of FIG. 7), a test pad (e.g., a test pad INP of FIG. 7), and a transmission line (e.g., a transmission line TRL of FIG. 7). The conductive pattern may receive a reference voltage. The test pad may be spaced apart from the conductive pattern. The transmission line may electrically connect the test pad and the driving chip TDDI. A detailed description thereof is provided with reference to FIG. 7 and FIG. 8.

The cover tape CT may be disposed on the substrate SUB on the pad area PDA. The cover tape CT may cover each of the circuit board FPCB and the driving chip TDDI. The cover tape CT may protect the driving chip TDDI from external shock. In addition, the cover tape CT may shield electromagnetic interference noise generated from the circuit board FPCB.

The cover tape CT may include a first conductive layer (e.g., a first conductive layer CDL1 of FIG. 10) and a second conductive layer (e.g., a second conductive layer CDL2 of FIG. 10). The first conductive layer may contact the test pad. The second conductive layer may be disposed on the first conductive layer and may contact the conductive pattern. A detailed description thereof is provided with reference to FIG. 9 and FIG. 10.

Figure 7:
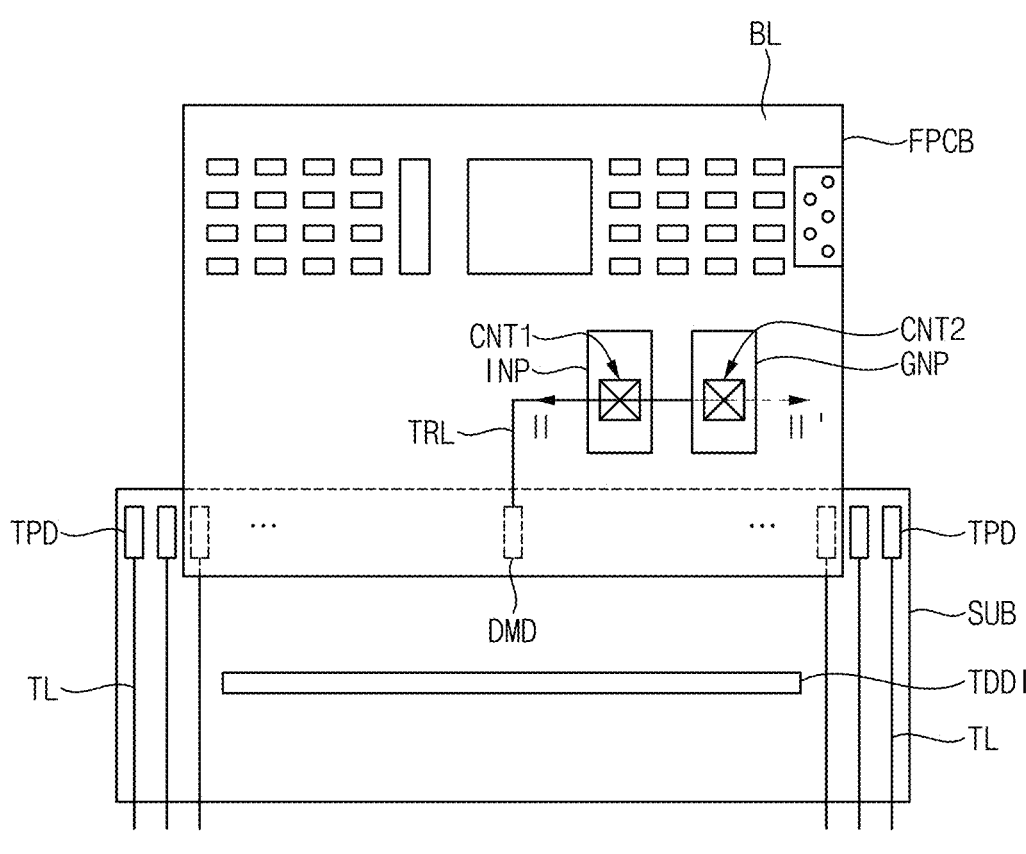
FIG. 7 is a plan view illustrating a circuit board included in the display device of FIG. 1.
Figure 7:
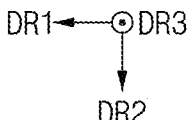
Figure 8:
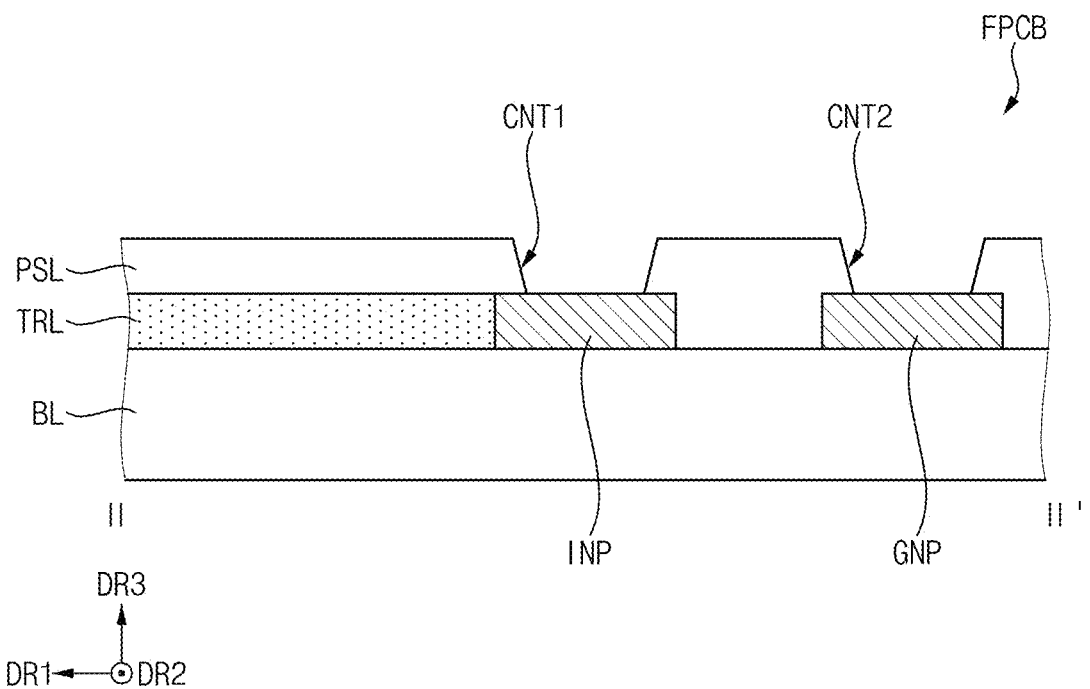
FIG. 8 is a cross-sectional view taken along line II-II' of FIG. 7.
Figure 9:
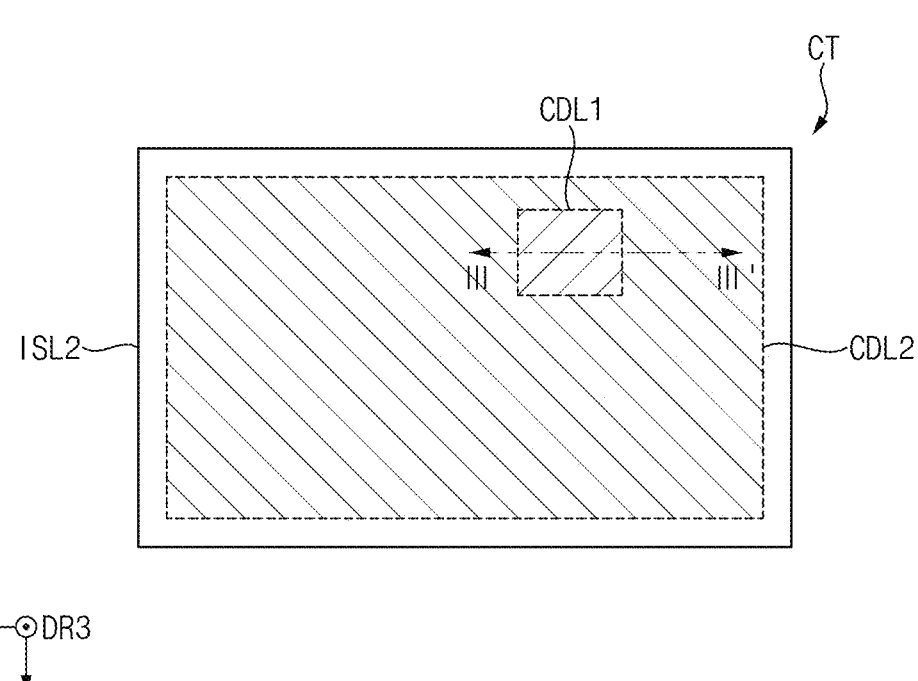
FIG. 9 is a plan view illustrating a cover tape included in the display device of FIG. 1.

FIG. 7 is a plan view illustrating a circuit board included in the display device of FIG. 1. FIG. 8 is a cross-sectional view taken along line II-II' of FIG. 7. FIG. 9 is a plan view illustrating a cover tape included in the display device of FIG. 1. FIG. 10 is a cross-sectional view taken along line III-III' of FIG. 9.

Referring to FIG. 7 and FIG. 8, the circuit board FPCB included in the display device DD according to an embodiment of the present disclosure may include a base layer BL, a conductive pattern GNP, a test pad INP, a transmission line TRL, and a circuit board insulating layer PSL.

The base layer BL may include synthetic resin. For example, the base layer BL may include polyimide-based resin.

The conductive pattern GNP may be disposed on the base layer BL. The conductive pattern GNP may receive a reference voltage. For example, the conductive pattern GNP may be a ground line. A ground voltage may be applied to the conductive pattern GNP. The conductive pattern GNP may not overlap the substrate SUB.

The test pad INP may be disposed on the base layer BL. The test pad INP may be spaced apart from the conductive pattern GNP. The test pad INP may not overlap the substrate SUB. The test pad INP may be defined as a pad for inspecting a phenomenon in which the cover tape is not smoothly attached to the circuit board FPCB and at least a portion of the cover tape is lifted from the circuit board FPCB. A detailed description thereof is provided with reference to FIG. 11 and FIG. 12.

The transmission line TRL may be disposed on the base layer BL. The transmission line TRL may be connected to the test pad INP. The transmission line TRL may electrically connect the test pad INP and the driving chip TDDI.

In an embodiment, the transmission line TRL may be electrically insulated from the touch electrodes (e.g., the touch electrodes TSE of FIG. 6) and the touch lines TL.

In an embodiment, the transmission line TRL may be electrically connected to a dummy touch pad DMD. Here, the dummy touch pad DMD may be a pad disposed on the substrate SUB in the pad area and spaced apart from the touch lines TL. In other words, the dummy touch pad DMD may be defined as a pad which is electrically isolated from the touch lines TL. The dummy touch pad DMD may be electrically connected to the driving chip TDDI. Accordingly, the transmission line TRL may be electrically connected to the driving chip TDDI through the dummy touch pad DMD.

Each of the conductive pattern GNP, the test pad INP, and the transmission line TRL may include a metal, an alloy, a metal nitride, a conductive metal oxide, or a transparent conductive material. These materials may be used alone or in combination with each other.

In an embodiment, the touch lines TL may be spaced apart from the circuit board FPCB. For example, the touch lines TL may not be disposed on the circuit board FPCB. When the driving chip TDDI includes a touch display driver integrated circuit in which a pixel driving circuit and a touch driving circuit are integrated, and the driving chip TDDI may be mounted on the substrate SUB, and a separate driving chip for driving the touch member (e.g., the touch member TSM of FIG. 6) may not be mounted on the circuit board FPCB. Accordingly, when a separate driving chip is not mounted on the circuit board FPCB, the touch lines TL may not be disposed on the circuit board FPCB.

The circuit board insulating layer PSL may be disposed on the base layer BL. The circuit board insulating layer PSL may cover the test pad INP, the conductive pattern GNP, and the transmission line TRL on the base layer BL. Accordingly, the circuit board insulating layer PSL may protect the test pad INP, the conductive pattern GNP, and the transmission line TRL. The circuit board insulating layer PSL may block noise such as static electricity generated from outside. The circuit board insulating layer PSL may include an inorganic insulating material and/or an organic insulating material. The circuit board insulating layer PSL may define a first contact hole CNT1 exposing a portion of the test pad INP and a second contact hole CNT2 exposing a portion of the conductive pattern GNP.

Referring further to FIG. 9 and FIG. 10, the cover tape CT included in the display device DD according to an embodiment of the present disclosure may include a first conductive layer CDL1, a first insulating layer ISL1, a second conductive layer CDL2, and a second insulating layer ISL2.

The first conductive layer CDL1 may include a first protrusion PTU1 protruding from a lower surface of the first conductive layer CDL1. When the cover tape CT covers the driving chip TDDI, the first conductive layer CDL1 may be spaced apart from the driving chip TDDI in a plan view. In other words, the first conductive layer CDL1 may not overlap the driving chip TDDI in a plan view.

The second conductive layer CDL2 may be disposed on the first conductive layer CDL1. The second conductive layer CDL2 may include a second protrusion PTU2 protruding from a lower surface of the second conductive layer CDL2. When the cover tape CT covers the driving chip TDDI, the second conductive layer CDL2 may overlap the driving chip TDDI. Accordingly, the second conductive layer CDL2 may protect the driving chip TDDI. For example, the second conductive layer CDL2 may shield the driving chip TDDI from electromagnetic interference noise. In an embodiment, as illustrated in FIG. 9, a first in-plane area on which the first conductive layer CDL1 is disposed may be smaller than a second in-plane area on which the second conductive layer CDL2 is disposed.

Each of the first conductive layer CDL1 and the second conductive layer CDL2 may include a metal, an alloy, a metal nitride, a conductive metal oxide, or a transparent conductive material. These materials may be used alone or in combination with each other.

The first insulating layer ISL1 may be disposed between the first conductive layer CDL1 and the second conductive layer CDL2. The first insulating layer ISL1 may cover the first conductive layer CDL1. The first insulating layer ISL1 may electrically insulate the first conductive layer CDL1 from the second conductive layer CDL2.

The second insulating layer ISL2 may be disposed on the second conductive layer CDL2. The second insulating layer ISL2 may cover the second conductive layer CDL2. Accordingly, the second insulating layer ISL2 may protect the second conductive layer CDL2. For example, the second insulating layer ISL2 may block the second conductive layer CDL2 from noise generated from the outside.

Each of the first insulating layer ISL1 and the second insulating layer ISL2 may include an insulating material having an adhesive property. For example, each of the first insulating layer ISL1 and the second insulating layer ISL2 may include a thermoplastic resin and/or a thermosetting resin.

Figure 12:
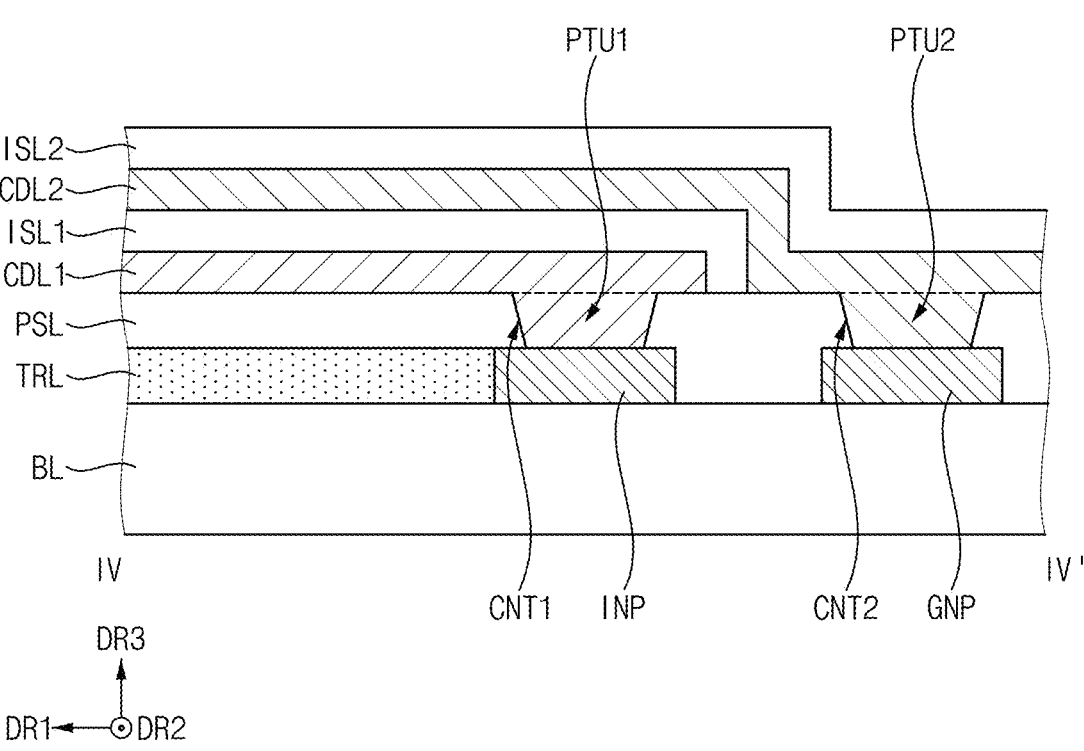
FIG. 12 is a cross-sectional view taken along line IV-IV' of FIG. 11.

FIG. 11 is a plan view illustrating the circuit board of FIG. 7 and the cover tape of FIG. 9 attached. FIG. 12 is a cross-sectional view taken along line IV-IV' of FIG. 11.

Referring to FIG. 11 and FIG. 12, the cover tape CT may be attached to the circuit board FPCB and the substrate SUB.

As illustrated in FIG. 11, the cover tape CT may cover each of the circuit board FPCB and the driving chip TDDI. For example, the cover tape CT may cover a portion of the circuit board FPCB and an entirety of the driving chip TDDI. The cover tape CT may overlap the conductive pattern GNP, the test pad INP, the transmission line TRL, the dummy touch pad DMD, and the driving chip TDDI in a plan view.

In an embodiment, as illustrated in FIG. 12, the first conductive layer CDL1 may directly contact the test pad INP through the first contact hole CNT1. For example, the first protrusion PTU1 of the first conductive layer CDL1 may directly contact the test pad INP through the first contact hole CNT1. However, the contact structure between the first conductive layer CDL1 and the test pad INP may not be limited thereto. Accordingly, the first conductive layer CDL1 may be electrically connected to the test pad INP.

In an embodiment, the second conductive layer CDL2 may directly contact the conductive pattern GNP through the second contact hole CNT2. For example, the second protrusion PTU2 of the second conductive layer CDL2 may directly contact the conductive pattern GNP through the second contact hole CNT2. However, the contact structure between the second conductive layer CDL2 and the conductive pattern GNP may not be limited thereto. Accordingly, the second conductive layer CDL2 may be electrically connected to the conductive pattern GNP. The second conductive layer CDL2 may receive a reference voltage from the conductive pattern GNP. For example, the reference voltage may be a ground voltage. Accordingly, the second conductive layer CDL2 may maintain the ground state.

In another embodiment, the cover tape CT may be attached to the circuit board FPCB through a conductive adhesive layer. In other words, the conductive adhesive layer may be disposed between the circuit board FPCB and the cover tape CT. The conductive adhesive layer may electrically connect the test pad INP and the first conductive layer CDL1. The conductive adhesive layer may electrically connect the conductive pattern GNP and the second conductive layer CDL2. That is, the first conductive layer CDL1 may be electrically connected to the test pad INP through the conductive adhesive layer, and the second conductive layer CDL2 may be electrically connected to the conductive pattern GNP through the conductive adhesive layer. For example, the conductive adhesive layer may be an adhesive layer in which an electromagnetic wave absorbing material is embedded.

When the cover tape CT is not smoothly attached to the circuit board FPCB and at least a portion of the cover tape CT is lifted from the circuit board FPCB, the second conductive layer CDL2 may not be electrically connected to each of the conductive pattern GNP and the driving chip TDDI.

In this case, from the perspective of the driving chip TDDI, the second conductive layer CDL2 may be recognized as a floating metal, and a first parasitic capacitance may be formed between the driving chip TDDI and the second conductive layer CDL2. When a first parasitic capacitance value between the driving chip TDDI and the second conductive layer CDL2 changes due to external noise, a ghost touch phenomenon in which a touch is recognized even when there is no external input may occur.

In order to detect the lifting phenomenon of the cover tape CT which causes the ghost touch phenomenon, the circuit board FPCB may include the test pad INP which contacts the first conductive layer CDL1. When the cover tape CT is lifted, the first conductive layer CDL1 may not be electrically connected to the test pad INP. In this case, from the perspective of the test pad INP, the first conductive layer CDL1 may be recognized as a floating metal, and a second parasitic capacitance may be formed between the test pad INP and the first conductive layer CDL1.

The transmission line TRL may be electrically connected to the test pad INP and the driving chip TDDI. Accordingly, when the cover tape CT is lifted, the transmission line TRL may transmit a second parasitic capacitance value between the test pad INP and the first conductive layer CDL1 to the driving chip TDDI. The driving chip TDDI may receive the second parasitic capacitance value from the transmission line TRL. The driving chip TDDI may compare the second parasitic capacitance value with a reference value for detecting the lifting phenomenon of the cover tape CT. When the difference between the second parasitic capacitance value and the reference value exceeds a predetermined range, the driving chip TDDI may determine that the cover tape CT has been lifted. Accordingly, the driving chip TDDI may detect the lifting phenomenon of the cover tape CT based on the second parasitic capacitance value between the test pad INP and the first conductive layer CDL1. That is, the driving chip TDDI may detect the lifting phenomenon of the cover tape CT. This detection may be performed during a manufacturing process of the display device DD. Accordingly, a defective cover tape that has lifted during the manufacturing process of the display device DD may be removed, and the cover tape CT may be attached normally to the circuit board FPCB. However, the present disclosure is not limited thereto. For example, a defective cover tape that has lifted during the manufacturing process of the display device DD may be smoothed (e.g., using heat and pressure), such that the cover tape CT may be attached normally to the circuit board FPCB. In another example, a defective cover tape that has lifted during the manufacturing process of the display device DD may be lifted and re-attached, such that the cover tape CT may be attached normally to the circuit board FPCB. Accordingly, the ghost touch phenomenon may be prevented, and detection reliability of the touch member (e.g., the touch member TSM of FIG. 6) may be improved.

When forming the test pad INP with a pad type to inspect the lifting phenomenon of the cover tape CT, compared to a case of forming a test pattern with a line type, the test pad INP may have a relatively large width (e.g., a length in the second direction DR2) in a plan view. In this case, an area in which the test pad INP and the first conductive layer CDL1 overlap in a plan view may be relatively large. Accordingly, an absolute value of the second parasitic capacitance between the test pad INP and the first conductive layer CDL1 may be relatively large. As the absolute value of the second parasitic capacitance may be relatively large, the driving chip TDDI may detect the lifting phenomenon of the cover tape CT.

Figure 13:
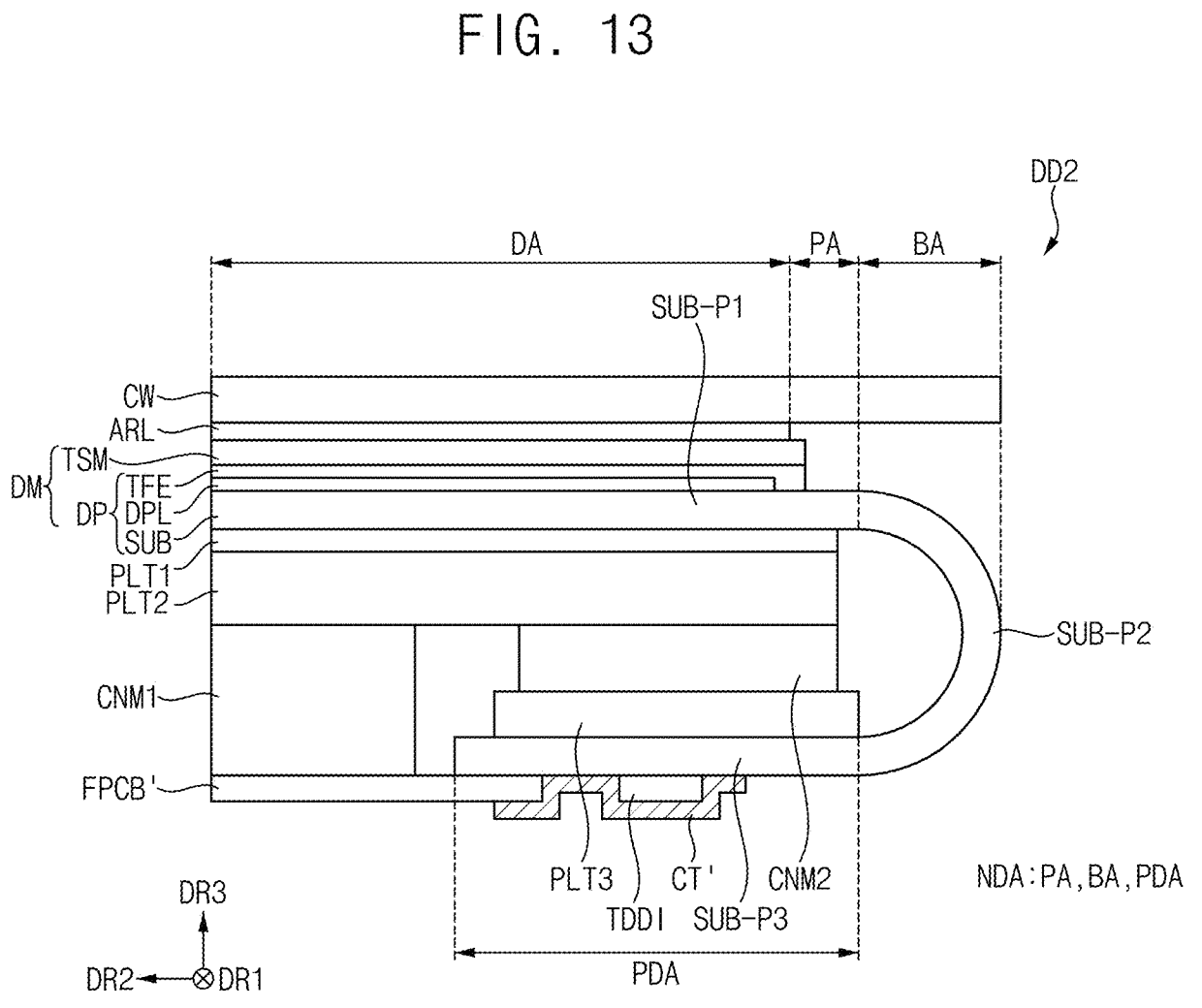
Figure 14:
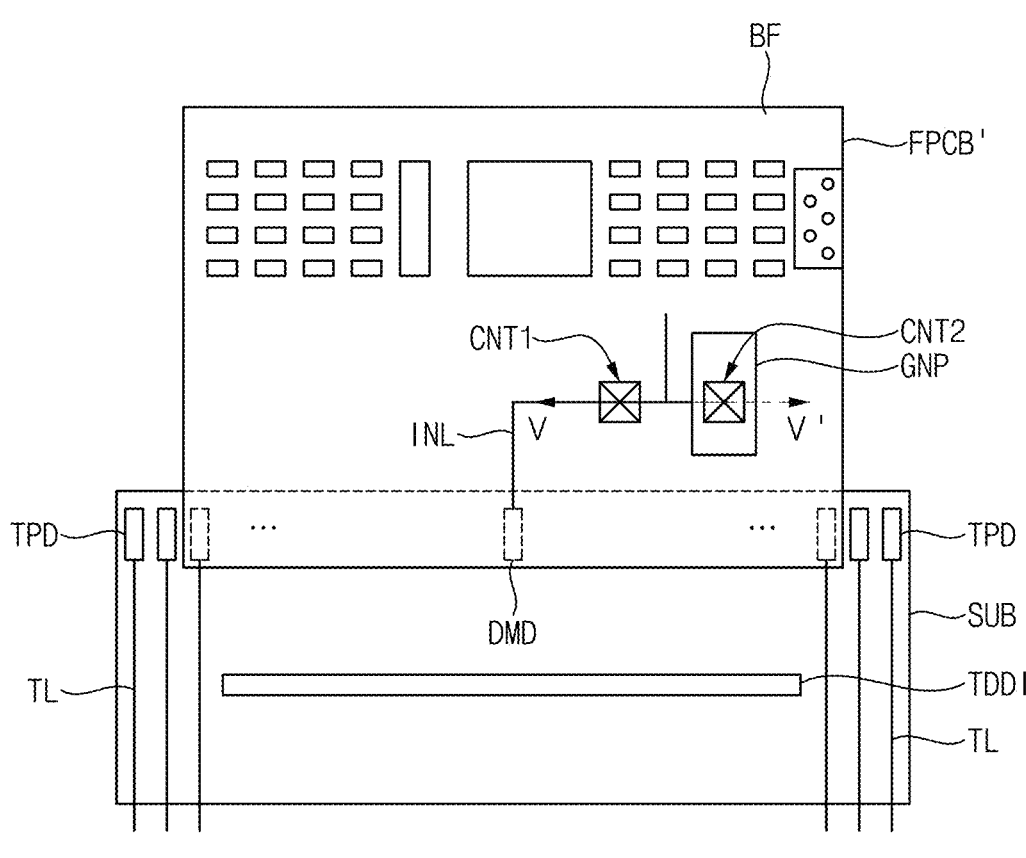
FIG. 14 is a plan view illustrating a circuit board included in the display device of FIG. 13.
Figure 14:
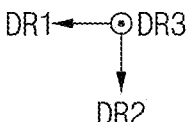
Figure 15:
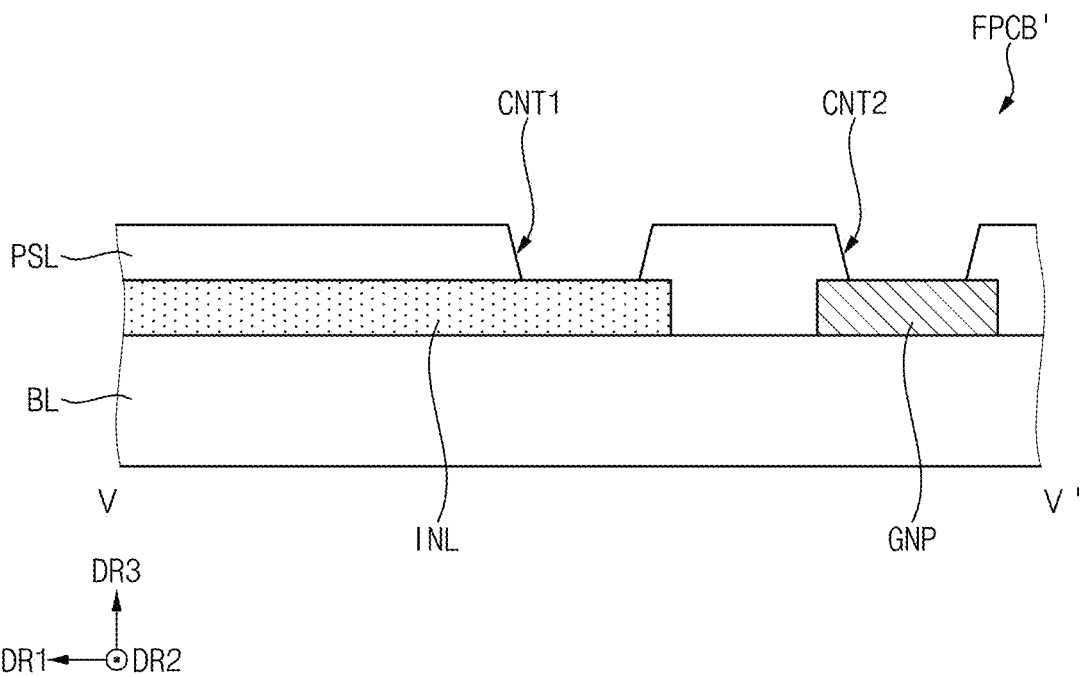
FIG. 15 is a cross-sectional view taken along line V-V' of FIG. 14.
Figure 16:
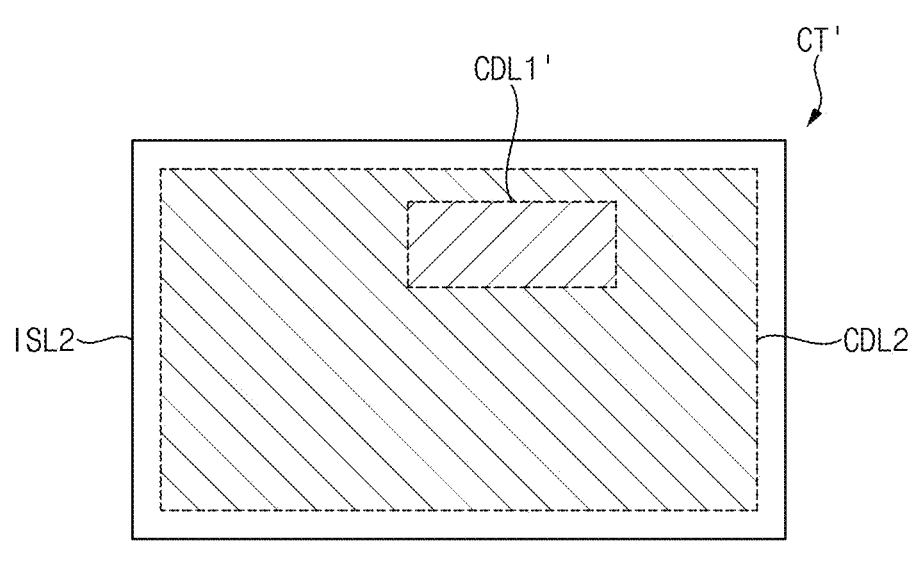
FIG. 16 is a plan view illustrating a cover tape included in the display device of FIG. 13.

FIG. 13 is a cross-sectional view illustrating a display device according to another embodiment of the present disclosure. FIG. 14 is a plan view illustrating a circuit board included in the display device of FIG. 13. FIG. 15 is a cross-sectional view taken along line V-V' of FIG. 14. FIG. 16 is a plan view illustrating a cover tape included in the display device of FIG. 13.

Referring to FIG. 13, FIG. 14, FIG. 15, and FIG. 16, a display device DD2 according to another embodiment of the present disclosure may include the cover window CW, the anti-reflection layer ARL, the display module DM, the first to third plates PLT1, PLT2, and PLT3, the first and second connection members CNM1 and CNM2, the driving chip TDDI, a circuit board FPCB', and a cover tape CT'. The display module DM may include the display panel DP and the touch member TSM. The display panel DP may include the substrate SUB, the display element layer DPL, and the encapsulation layer TFE.

Hereinafter, redundant description of the same or substantially the same components as those of the display device DD described above with reference to FIGS. 1 to 12 may not be repeated or may be simplified. The display device DD2 may be substantially the same as the display device DD described with reference to FIGS. 1 to 12; in addition or alternatively the contact structure between the circuit board FPCB' and the cover tape CT' may be changed. Specifically, the display device DD2 may be substantially the same as the display device DD described with reference to FIGS. 1 to 12; in addition or alternatively a test line INL of the circuit board FPCB' may contact a first conductive layer CDL1' of the cover tape CT'.

As illustrated in FIG. 14 and FIG. 15, the circuit board FPCB' included in the display device DD2 according to another embodiment of the present disclosure may include the base layer BL, the conductive pattern GNP, the test line INL, and the circuit board insulating layer PSL.

The conductive pattern GNP may be disposed on the base layer BL. The conductive pattern GNP may be exposed by circuit board insulating layer PSL. The conductive pattern GNP may receive a reference voltage. For example, a ground voltage may be applied to the conductive pattern GNP. The conductive pattern GNP may not overlap the substrate SUB.

The test line INL may be disposed on the base layer BL. The test line INL may be exposed by circuit board insulating layer PSL. The test line INL may be spaced apart from the conductive pattern GNP. The test line INL may not overlap the substrate SUB. The test line INL may be electrically connected to the driving chip TDDI.

In an embodiment, the test line INL may be electrically insulated from the touch electrodes (e.g., the touch electrodes TSE of FIG. 6) and the touch lines TL.

In an embodiment, the test line INL may be electrically connected to the dummy touch pad DMD. Here, the dummy touch pad DMD may be a pad which is electrically isolated from the touch lines TL. The dummy touch pad DMD may be electrically connected to the driving chip TDDI. Accordingly, the test line INL may be electrically connected to the driving chip TDDI through the dummy touch pad DMD.

The test line INL may be defined as a line for inspecting a phenomenon in which the cover tape CT' is not smoothly attached to the circuit board FPCB' and at least a portion of the cover tape CT' is lifted from the circuit board FPCB'. A detailed description thereof is provided with reference to FIG. 17 and FIG. 18.

Each of the conductive pattern GNP and the test line INL may include a metal, an alloy, a metal nitride, a conductive metal oxide, or a transparent conductive material. These may be used alone or in combination with each other.

In an embodiment, the touch lines TL may be spaced apart from the circuit board FPCB'. In other words, the touch lines TL may not be disposed on the circuit board FPCB'.

The circuit board insulating layer PSL may be disposed on the base layer BL. The circuit board insulating layer PSL may cover the test line INL and the conductive pattern GNP on the base layer BL. The circuit board insulating layer PSL may define a first contact hole CNT1 exposing a portion of the test line INL and a second contact hole CNT2 exposing a portion of the conductive pattern GNP. At least a portion of the circuit board insulating layer PSL may be disposed on the base layer BL between the test line INL and the conductive pattern GNP.

As illustrated in FIG. 16, the cover tape CT' included in the display device DD2 according to another embodiment of the present disclosure may include a first conductive layer CDL1', a first insulating layer ISL1 (see FIG. 18), a second conductive layer CDL2, and a second insulating layer ISL2.

The cross-sectional structure of the cover tape CT' may be substantially the same as the cross-sectional structure of the cover tape CT described with reference to FIG. 10. That is, the first conductive layer CDL1' may include a first protrusion protruding from a lower surface of the first conductive layer CDL1'. The second conductive layer CDL2 may be disposed on the first conductive layer CDL1' and may include a second protrusion protruding from a lower surface of the second conductive layer CDL2. The first insulating layer ISL1 may be disposed between the first conductive layer CDL1' and the second conductive layer CDL2. The second insulating layer ISL2 may be disposed on the second conductive layer CDL2.

In an embodiment, a third in-plane area on which the first conductive layer CDL1' is disposed may be smaller than a fourth in-plane area on which the second conductive layer CDL2 is disposed.

The third in-plane area on which the first conductive layer CDL1' of the cover tape CT' is disposed may be greater than the first in-plane area on which the first conductive layer CDL1 of the cover tape CT is disposed. The fourth in-plane area on which the second conductive layer CDL2 of the cover tape CT' is disposed may be substantially the same as the second in-plane area on which the second conductive layer CDL2 of the cover tape CT is disposed.

Figure 17:
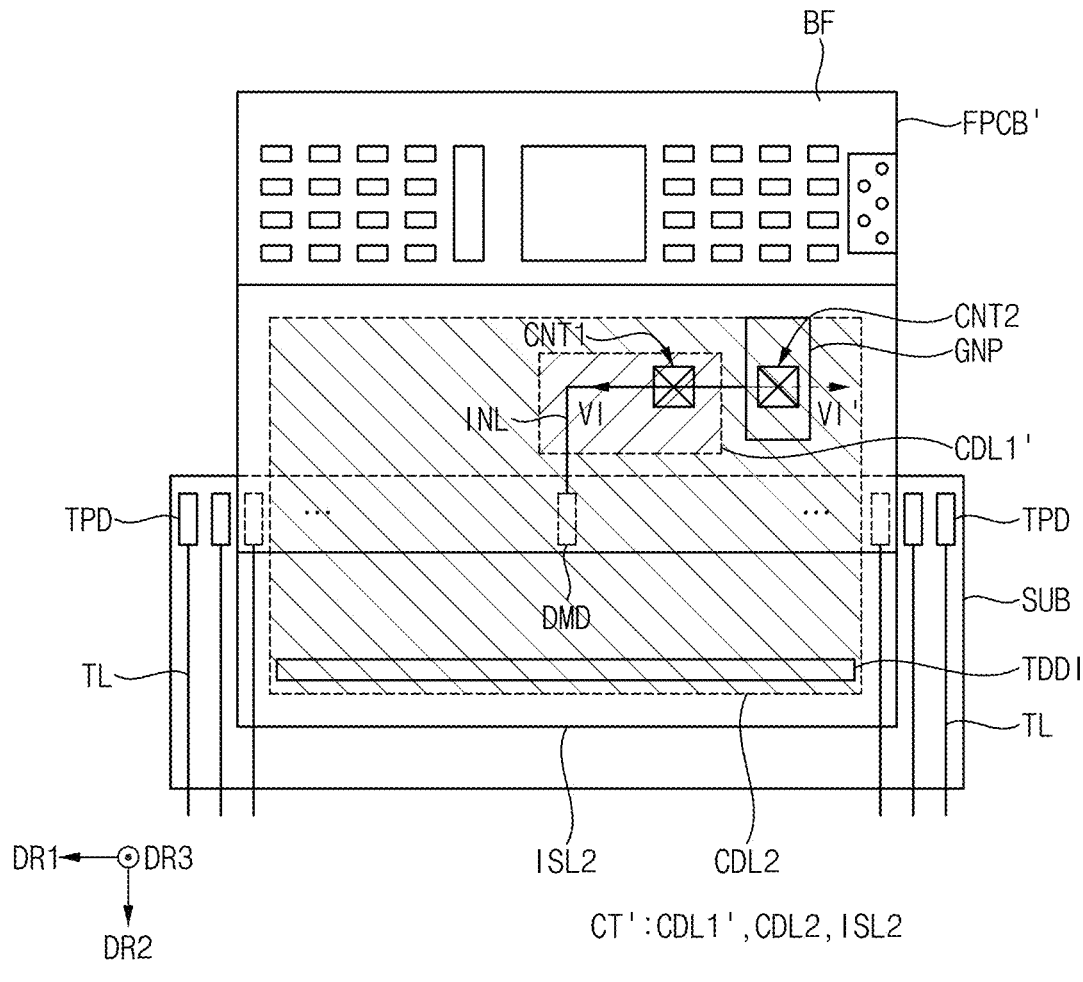
FIG. 17 is a plan view illustrating the circuit board of FIG. 14 and the cover tape of FIG. 16 attached.
Figure 18:
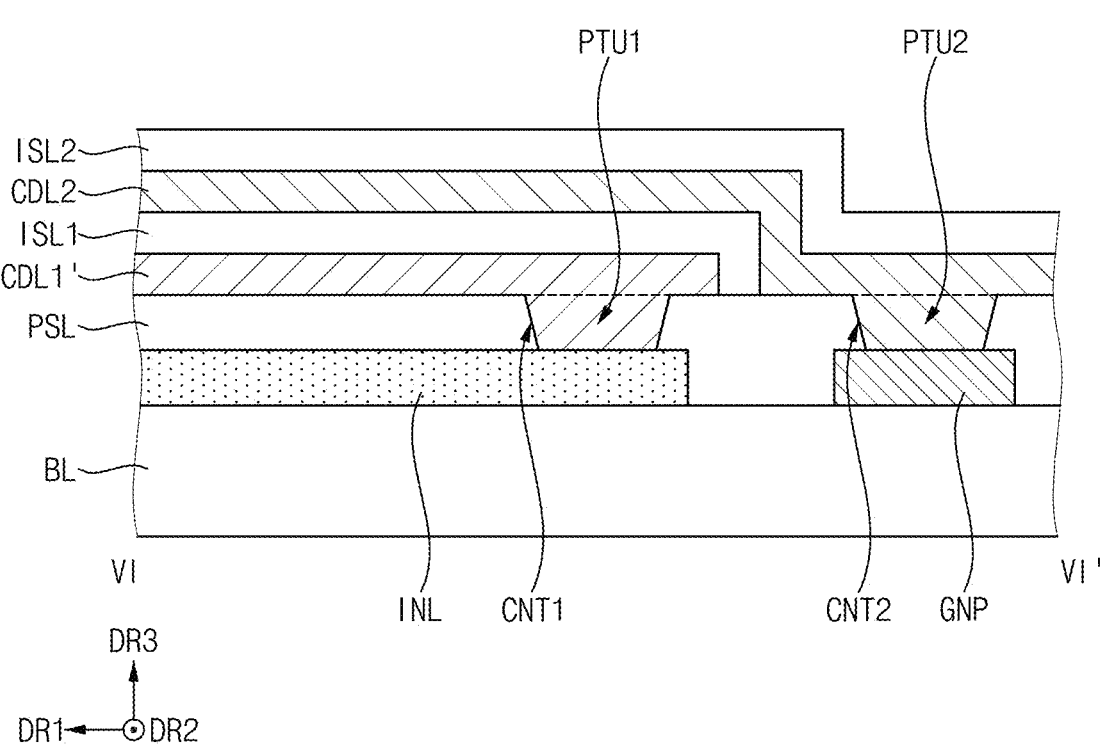
FIG. 18 is a cross-sectional view taken along line VI-VI' of FIG. 17.

FIG. 17 is a plan view illustrating the circuit board of FIG. 14 and the cover tape of FIG. 16 attached. FIG. 18 is a cross-sectional view taken along line VI-VI' of FIG. 17.

Referring to FIG. 17 and FIG. 18, the cover tape CT' may be attached to the circuit board FPCB' and the substrate SUB.

As illustrated in FIG. 17, the cover tape CT' may cover each of the circuit board FPCB' and the driving chip TDDI. For example, the cover tape CT' may cover a portion of the circuit board FPCB' and an entirety of the driving chip TDDI. The cover tape CT' may overlap the conductive pattern GNP, the test line INL, the dummy touch pad DMD, and the driving chip TDDI in a plan view.

In an embodiment, as illustrated in FIG. 18, the first conductive layer CDL1' may directly contact the test line INL through the first contact hole CNT1. For example, the first protrusion PTU1 of the first conductive layer CDL1' may directly contact the test line INL through the first contact hole CNT1. However, the contact structure between the first conductive layer CDL1' and the test line INL is not limited thereto. Accordingly, the first conductive layer CDL1' may be electrically connected to the test line INL.

In an embodiment, the second conductive layer CDL2 may directly contact the conductive pattern GNP through the second contact hole CNT2. For example, the second protrusion PTU2 of the second conductive layer CDL2 may directly contact the conductive pattern GNP through the second contact hole CNT2. However, the contact structure between the second conductive layer CDL2 and the conductive pattern GNP is not limited thereto. Accordingly, the second conductive layer CDL2 may be electrically connected to the conductive pattern GNP. The second conductive layer CDL2 may receive a reference voltage from the conductive pattern GNP. For example, the reference voltage may be a ground voltage. Accordingly, the second conductive layer CDL2 may maintain the ground state.

Portions of the first conductive layer CDL1' and the second conductive layer CDL2 at a same vertical height (e.g., in the third direction DR3) may be spaced apart and separated by portions of the first insulating layer ISL1 and the circuit board insulating layer PSL.

In another embodiment, the cover tape CT' may be attached to the circuit board FPCB' through a conductive adhesive layer. In other words, the conductive adhesive layer may be disposed between the circuit board FPCB' and the cover tape CT'. The conductive adhesive layer may electrically connect the test line INL and the first conductive layer CDL1'. The conductive adhesive layer may electrically connect the conductive pattern GNP and the second conductive layer CDL2.

In order to detect the lifting phenomenon of the cover tape CT', which may cause the ghost touch phenomenon, the circuit board FPCB' may include the test line INL which contacts the first conductive layer CDL1'. When the cover tape CT' is lifted, the first conductive layer CDL1' may not be electrically connected to the test line INL. In this case, from the perspective of the test line INL, the first conductive layer CDL1' may be recognized as a floating metal, and a third parasitic capacitance may be formed between the test line INL and the first conductive layer CDL1'.

The test line INL may be electrically connected to the driving chip TDDI. Accordingly, when the cover tape CT' is lifted, the test line INL may transmit a third parasitic capacitance value between the test line INL and the first conductive layer CDL1' to the driving chip TDDI. The driving chip TDDI may receive the third parasitic capacitance value from the test line INL. The driving chip TDDI may compare the third parasitic capacitance value with a reference value for checking the lifting phenomenon of the cover tape CT'. When the difference between the third parasitic capacitance value and the reference value exceeds a predetermined range, the driving chip TDDI may determine that the cover tape CT' has been lifted. Accordingly, the driving chip TDDI may detect the lifting phenomenon of the cover tape CT' based on the third parasitic capacitance value between the test line INL and the first conductive layer CDL1'. A defective cover tape that has lifted during the manufacturing process of the display device DD2 may be removed, and the cover tape CT' may be attached normally to the circuit board FPCB. However, the present disclosure is not limited thereto. For example, a defective cover tape that has lifted during the manufacturing process of the display device DD2 may be smoothed (e.g., using heat and pressure), such that the cover tape CT' may be attached normally to the circuit board FPCB. In another example, a defective cover tape that has lifted during the manufacturing process of the display device DD2 may be lifted and re-attached, such that the cover tape CT' may be attached normally to the circuit board FPCB. Accordingly, the ghost touch phenomenon may be prevented, and detection reliability of the touch member (e.g., the touch member TSM of FIG. 6) may be improved.

The third in-plane area on which the first conductive layer CDL1' of the cover tape CT' is disposed may be greater than the first in-plane area on which the first conductive layer CDL1 of the cover tape CT, which is illustrated in FIG. 9, is disposed. In this case, an area in which the test line INL and the first conductive layer CDL1' overlap in a plan view may be relatively large. Accordingly, an absolute value of the third parasitic capacitance between the test line INL and the first conductive layer CDL1' may be relatively large. As the absolute value of the third parasitic capacitance relatively increases, the driving chip TDDI may more easily detect the lifting phenomenon of the cover tape CT'.

Figure 19:
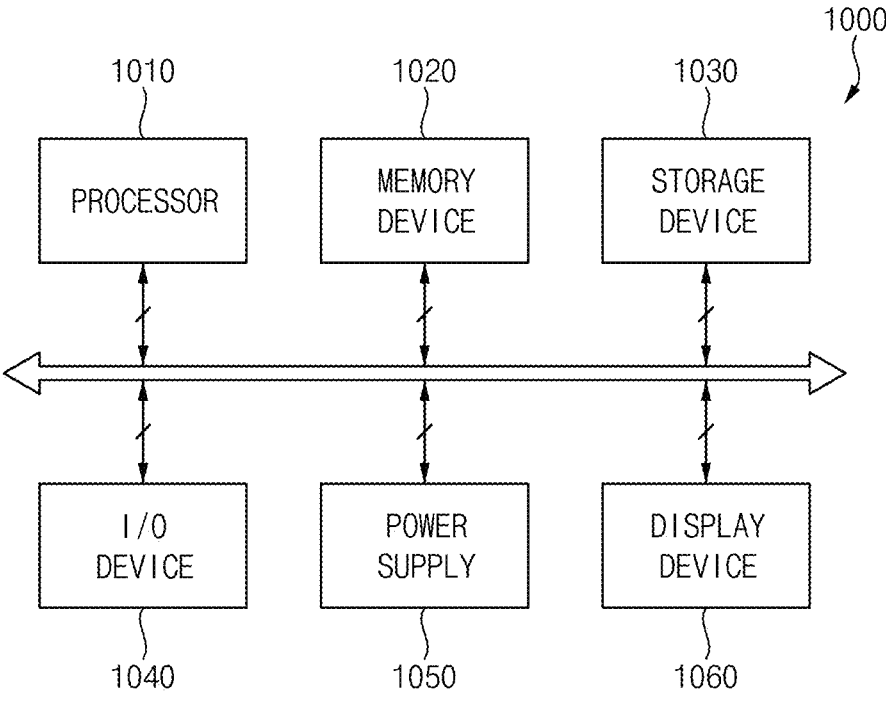
FIG. 19 is a block diagram illustrating an electronic device according to an embodiment of the present disclosure.
Figure 20:
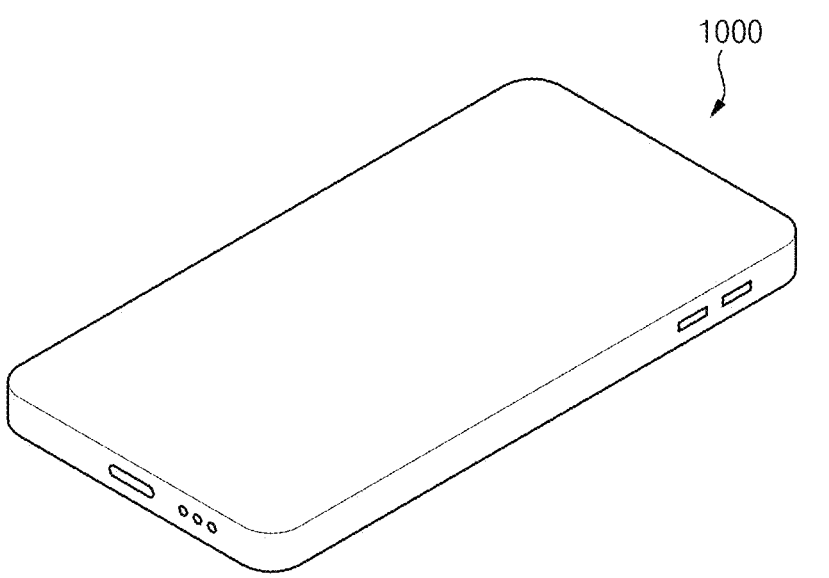
FIG. 20 is a view illustrating an example in which the electronic device of FIG. 19 is implemented as a smart phone.

FIG. 19 is a block diagram illustrating an electronic device according to an embodiment of the present disclosure. FIG. 20 is a view illustrating an example in which the electronic device of FIG. 19 is implemented as a smart phone.

Referring to FIGS. 19 and 20, an electronic device 1000 may include a processor 1010, a memory device 1020, a storage device 1030, an input/output (I/O) device 1040, a power supply 1050, and a display device 1060. The display device 1060 may be the display device DD of FIG. 1. In addition, the electronic device 1000 may further include a plurality of ports for communicating with a video card, a sound card, a memory card, a universal serial bus (USB) device, other systems, and the like.

In an embodiment, as illustrated in FIG. 20, the electronic device 1000 may be implemented as a smart phone. However, the electronic device 1000 is not limited thereto. For example, the electronic device 1000 may be implemented as a smart pad, a smart watch, a tablet PC, a car navigation system, a computer monitor, a laptop, a head mounted display ("HMD") device, and the like.

The processor 1010 may perform various computing functions. The processor 1010 may be a microprocessor, a central processing unit ("CPU"), an application processor ("AP"), and the like. The processor 1010 may be coupled to other components through an address bus, a control bus, a data bus, and the like. In an embodiment, the processor 1010 may be coupled to an extended bus such as a peripheral component interconnection ("PCI") bus.

The memory device 1020 may store data for operations of the electronic device 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like.

The storage device 1030 may include a solid-state drive ("SSD") device, a hard disk drive ("HDD") device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000. In other words, the power supply 1050 may provide power to the display device 1060. The display device 1060 may be connected to other components through buses or other communication links.

Aspects of the present disclosure may be applied to various display devices. For example, the present disclosure may be applicable to various display devices such as display devices for vehicles, ships and aircraft, portable communication devices, display devices for exhibition or information transmission, medical display devices, and the like.

The foregoing is illustrative of embodiments of the present disclosure, and is not to be construed as limiting thereof. Although embodiments have been described with reference to the figures, those skilled in the art will readily appreciate that many variations and modifications may be made therein without departing from the spirit and scope of the present disclosure as defined in the appended claims.

What is claimed is:

1. A display device comprising:
a substrate including a display area on which a plurality of pixels are disposed and a pad area disposed on a side of the display area;
a touch member disposed on the substrate in the display area and including a plurality of touch electrodes;
a driving chip disposed on the substrate in the pad area and configured to drive each of the plurality of pixels and the plurality of touch electrodes;
a circuit board disposed on the substrate in the pad area and including a conductive pattern, which is configured to receive a reference voltage; and
a cover tape disposed on the driving chip and the circuit board, and including a first conductive layer, which is electrically connected to the driving chip, and a second conductive layer which is disposed on the first conductive layer and is electrically connected to the conductive pattern.

2. The display device of claim 1, further comprising:
a plurality of touch pads disposed on the substrate in the pad area and electrically connected to the driving chip; and
a dummy touch pad disposed on the substrate in the pad area and electrically connected to the driving chip,
wherein the circuit board further includes one of a test line which is spaced apart from the conductive pattern and is electrically connected to the driving chip through the dummy touch pad or a test pad spaced apart from the conductive pattern, and a transmission line which electrically connects the test pad and the driving chip through the dummy touch pad.

3. A display device comprising:
a substrate including a display area on which a plurality of pixels are disposed and a pad area disposed on a side of the display area;
a touch member disposed on the substrate in the display area and including a plurality of touch electrodes;
a driving chip disposed on the substrate in the pad area and configured to drive each of the plurality of pixels and the plurality of touch electrodes;
a circuit board disposed on the substrate in the pad area and including a conductive pattern, which is configured to receive a reference voltage, a test pad spaced apart from the conductive pattern, and a transmission line which electrically connects the test pad and the driving chip; and
a cover tape disposed on the driving chip and the circuit board, and including a first conductive layer which is electrically connected to the test pad and a second conductive layer which is disposed on the first conductive layer and is electrically connected to the conductive pattern.

4. The display device of claim 3, further comprising:
a plurality of touch lines disposed on the substrate and electrically connecting the plurality of touch lines and the driving chip, wherein the plurality of touch lines are spaced apart from the circuit board.

5. The display device of claim 4, wherein the transmission line is electrically insulated from the plurality of touch electrodes and the plurality of touch lines.

6. The display device of claim 4, further comprising:
a plurality of touch pads disposed on the substrate in the pad area and electrically connecting the plurality of touch lines and the driving chip; and
a dummy touch pad disposed on the substrate in the pad area, spaced apart from the plurality of touch lines, and electrically connected to the driving chip,
wherein the transmission line is electrically connected to the driving chip through the dummy touch pad.

7. The display device of claim 3, wherein the driving chip is configured to detect a lifting phenomenon of the cover tape based on a parasitic capacitance value,
wherein the transmission line is configured to transmit the parasitic capacitance value between the test pad and the first conductive layer to the driving chip when the cover tape is lifted from the circuit board.

8. The display device of claim 3, wherein a first in-plane area on which the first conductive layer is disposed is smaller than a second in-plane area on which the second conductive layer is disposed.

9. The display device of claim 3, wherein the substrate includes:
a first portion on which the plurality of pixels are disposed;
a second portion extending from the first portion and having a curvature following a bending of the substrate; and
a third portion extending from the second portion, facing the first portion, and on which the driving chip is disposed.

10. The display device of claim 3, wherein the cover tape is disposed on at least a portion of the circuit board in the pad area, covers the test pad, the conductive pattern, and the transmission line of the circuit board, and covers the driving chip,
the test pad directly contacts the first conductive layer, and
the conductive pattern directly contacts the second conductive layer.

11. The display device of claim 3, further comprising:
a conductive adhesive layer disposed between the circuit board and the cover tape, electrically connecting the test pad and the first conductive layer, and electrically connecting the conductive pattern and the second conductive layer.

12. The display device of claim 3, wherein the cover tape further includes:
a first insulating layer disposed between the first conductive layer and the second conductive layer, and electrically insulating the first conductive layer from the second conductive layer; and
a second insulating layer disposed on the second conductive layer.

13. The display device of claim 3, wherein the circuit board further includes an insulating layer covering the conductive pattern, the test pad, and the transmission line, and
the insulating layer defines a first contact hole exposing the test pad and a second contact hole exposing the conductive pattern.

14. A display device comprising:

a substrate including a display area on which a plurality of pixels are disposed and a pad area disposed on a side of the display area;

a touch member disposed on the substrate in the display area and including a plurality of touch electrodes;

a driving chip disposed on the substrate in the pad area and configured to drive each of the plurality of pixels and the plurality of touch electrodes;

a circuit board disposed on the substrate in the pad area and including a conductive pattern, which is configured to receive a reference voltage, and a test line which is spaced apart from the conductive pattern and is electrically connected to the driving chip; and a cover tape disposed on the driving chip and the circuit board, and including a first conductive layer which is electrically connected to the test line and a second conductive layer which is disposed on the first conductive layer and is electrically connected to the conductive pattern.

15. The display device of claim 14, further comprising:

a plurality of touch lines disposed on the substrate and electrically connecting the plurality of touch electrodes and the driving chip, wherein the plurality of touch lines are spaced apart from the circuit board.

16. The display device of claim 15, wherein the test line is electrically insulated from the plurality of touch electrodes and the plurality of touch lines.

17. The display device of claim 15, further comprising:

a plurality of touch pads disposed on the substrate in the pad area and electrically connecting the plurality of touch lines and the driving chip; and a dummy touch pad disposed on the substrate in the pad area, spaced apart from the plurality of touch lines, and electrically connected to the driving chip, wherein the test line is electrically connected to the driving chip through the dummy touch pad.

18. The display device of claim 14, wherein the cover tape is disposed on at least a portion of the circuit board in the pad area, covers the test line and the conductive pattern of the circuit board, and covers the driving chip, the driving chip is configured to detect a lifting phenomenon of the cover tape based on a parasitic capacitance value, wherein the test line is configured to transmit the parasitic capacitance value between the test line and the first conductive layer to the driving chip when the cover tape is lifted from the circuit board.

19. The display device of claim 14, wherein the cover tape is disposed on the substrate and the driving chip is disposed between the substrate and the cover tape, and a first in-plane area on which the first conductive layer is disposed is smaller than a second in-plane area on which the second conductive layer is disposed.

20. The display device of claim 14, wherein the substrate includes:

a first portion on which the plurality of pixels are disposed;

a second portion extending from the first portion and having a curvature following a bending of the substrate; and a third portion extending from the second portion, facing the first portion, and on which the driving chip is disposed.

21. An electronic device comprising:

a display device; and a power supply configured to provide power to the display device, wherein the display device comprises:

a substrate including a display area on which a plurality of pixels are disposed and a pad area disposed on a side of the display area;

a touch member disposed on the substrate in the display area and including a plurality of touch electrodes;

a driving chip disposed on the substrate in the pad area and configured to drive each of the plurality of pixels and the plurality of touch electrodes;

a circuit board disposed on the substrate in the pad area and including a conductive pattern, which is configured to receive a reference voltage; and a cover tape disposed on the driving chip and the circuit board, and including a first conductive layer, which is electrically connected to the driving chip, and a second conductive layer which is disposed on the first conductive layer and is electrically connected to the conductive pattern.

* * * * *